United States Patent
Tanabe et al.

(10) Patent No.: US 12,090,945 B2
(45) Date of Patent: Sep. 17, 2024

(54) VEHICLE SEAT

(71) Applicant: TS TECH CO., LTD., Asaka (JP)

(72) Inventors: Jinichi Tanabe, Tochigi (JP); Tatsuki Nonaka, Tochigi (JP); Atsushi Yamabe, Tochigi (JP); Tsuyoshi Sato, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 18/501,119

(22) Filed: Nov. 3, 2023

(65) Prior Publication Data

US 2024/0067119 A1    Feb. 29, 2024

Related U.S. Application Data

(63) Continuation of application No. 17/788,464, filed as application No. PCT/JP2020/048461 on Dec. 24, 2020, now Pat. No. 11,851,022.

(30) Foreign Application Priority Data

Dec. 24, 2019 (JP) .................. 2019-233546

(51) Int. Cl.
*B60R 21/215* (2011.01)
*B60R 21/207* (2006.01)
*B60R 21/231* (2011.01)

(52) U.S. Cl.
CPC .......... *B60R 21/215* (2013.01); *B60R 21/207* (2013.01); *B60R 21/23138* (2013.01); *B60R 2021/23146* (2013.01)

(58) Field of Classification Search
CPC ............... B60R 21/215; B60R 21/207; B60R 21/23138
See application file for complete search history.

(56) References Cited

U.S. PATENT DOCUMENTS

| 9,321,418 B2 | 4/2016 | Sahashi |
| 9,744,934 B2 | 8/2017 | Lafferty |
| (Continued) | | |

FOREIGN PATENT DOCUMENTS

| DE | 102015207487 | 10/2015 |
| DE | 102016001585 | 8/2017 |
| (Continued) | | |

OTHER PUBLICATIONS

Extended European Search Report for corresponding Application No. 20904570.7, dated Jan. 9, 2024, 7 pages.

(Continued)

*Primary Examiner* — Faye M Fleming
(74) *Attorney, Agent, or Firm* — Dority & Manning, P.A.

(57) ABSTRACT

To provide a vehicle seat which makes the load from the airbag more likely to be concentrated on a weakened part of a skin member, a vehicle seat provided with a seat cushion constituting a seating surface and a seat back constituting a backrest including a seat back frame forming a structural member of the seat back; an airbag module supported on a side portion of the seat back frame on a vehicle outer side; a pad member covering the airbag module; and a skin member covering a surface of the pad member, wherein the skin member is provided with a weakened part vertically extending on an edge part of the seat back on a vehicle outer side and a first low-elasticity reinforcement part extending from a vicinity of the weakened part in a direction intersecting with the weakened part.

14 Claims, 24 Drawing Sheets

(56) References Cited

U.S. PATENT DOCUMENTS

| | | | |
|---|---|---|---|
| 10,369,952 B2 | 8/2019 | Jenny et al. | |
| 11,110,880 B2 | 9/2021 | Haseborg et al. | |
| 11,124,148 B2 | 9/2021 | Zischka et al. | |
| 11,414,041 B2 | 8/2022 | Toba et al. | |
| 11,851,022 B2 * | 12/2023 | Tanabe | B60R 21/207 |
| 2002/0063452 A1 | 5/2002 | Harada et al. | |
| 2014/0070594 A1 | 3/2014 | Awata et al. | |
| 2015/0336528 A1 | 11/2015 | Tanabe et al. | |
| 2017/0282766 A1 | 10/2017 | Sekino et al. | |

FOREIGN PATENT DOCUMENTS

| | | |
|---|---|---|
| JP | H09202205 | 8/1997 |
| JP | H11129856 | 5/1999 |
| JP | 2000016223 | 1/2000 |
| JP | 3497390 | 2/2004 |
| JP | 2006036209 | 2/2006 |
| JP | 2011183942 | 9/2011 |
| JP | 2015003578 | 1/2015 |
| JP | 2017071298 | 4/2017 |
| JP | 2017177993 | 10/2017 |

OTHER PUBLICATIONS

Office Action (with English translation) received in corresponding Application No. JP 2021-567615, dated Jul. 5, 2023, 9 pages.
PCT International Search Report (w/ English translation) for corresponding PCT Application No. PCT/JP2020/048461, mailed on Mar. 23, 2021, 6 pages.

* cited by examiner

VEHICLE SEAT

CROSS REFERENCE TO RELATED APPLICATIONS

This application is a continuation of U.S. patent application Ser. No. 17/788,464, filed on Jun. 23, 2022, which is the U.S. National Stage entry of International Application No. PCT/JP2020/048461, filed on Dec. 24, 2020, which, in turn, claims priority to Japanese Patent Application No. 2019-233546, filed on Dec. 24, 2019, all of which are incorporated herein by reference in their entireties for all purposes.

TECHNICAL FIELD

The present invention relates to a vehicle seat, and particularly to a vehicle seat provided with an airbag module.

BACKGROUND ART

There is known a vehicle seat to be installed in a vehicle and provided with a side airbag device for protecting the occupant from the side (for example, Patent Document 1). The airbag device includes an inflator, which is a gas generator, an airbag that is caused to expand by the gas from the inflator, and an airbag case that contains the airbag and the inflator. The airbag device is embedded in a door-side part of the backrest (seat back) of the seat.

The seat cover covering the seat back is provided with a top plate side part and a frame covering part. The top plate side part covers a side portion of a front surface of the seat back. The frame covering part is positioned on a side of the seat back and covers an opening of the airbag case. The top plate side part and the frame covering part are sutured to each other at a sutured part that is positioned on a seat outer side and obliquely in front of the airbag case. When the gas is supplied from the inflator, the airbag swells toward the sutured part, and the parts near the sutured part such as the top plate side part and the suture thread are ruptured and split open due to the deployment pressure of the airbag.

The frame covering part is constituted of a member having lower expansion and contraction properties than the other part of the seat cover. Thereby, when the deployment pressure of the swelling airbag is applied to the inner surface of the frame covering part, the parts near the sutured part can be ruptured more promptly.

PRIOR ART DOCUMENT(S)

Patent Document

[Patent Document 1] JPH9-202205A

SUMMARY OF THE INVENTION

Task to be Accomplished by the Invention

When the gas is supplied from the inflator, the airbag swells not only obliquely forward but also upward and downward. Therefore, there is a problem that the load from the airbag is unlikely to be concentrated on the sutured part (weakened part).

In view of the foregoing background, an object of the present invention is to provide a vehicle seat which makes the load from the airbag more likely to be concentrated on the weakened part of the skin member.

Means to Accomplish the Task

To achieve the above object, a vehicle seat (1, 101, 201, 301, 401, 501, 601, 701, 801) provided with a seat cushion (5) constituting a seating surface (9) and a seat back (6) constituting a backrest comprises: a seat back frame (22) forming a structural member of the seat back; an airbag module (60) supported on a side portion of the seat back frame on a vehicle outer side; a pad member (23) covering the airbag module; and a skin member (24) covering a surface of the pad member, wherein the skin member is provided with a weakened part (88) vertically extending on an edge part of the seat back on the vehicle outer side and a first low-elasticity reinforcement part (102) extending from a vicinity of the weakened part in a direction intersecting with the weakened part.

According to this configuration, when the airbag expands and reaches the first low-elasticity reinforcement part, the expansion of the airbag is suppressed by the first low-elasticity reinforcement part. Thereby, the deployment direction of the airbag is guided toward the weakened part, and therefore, the load from the airbag is more likely to be concentrated on the weakened part.

In the above aspect, preferably, the skin member is provided with a second low-elasticity reinforcement part (104) extending in the direction intersecting with the weakened part and having an end portion joined to a position adjacent to the weakened part, and the first low-elasticity reinforcement part is provided above or below the second low-elasticity reinforcement part.

According to this configuration, when a load is applied to the second low-elasticity reinforcement part due to expansion of the airbag, the load is transmitted to the weakened part. Therefore, the load is likely to be applied to the weakened part and this facilitates tearing of the weakened part. Also, since the first low-elasticity reinforcement part is provided above or below the second low-elasticity reinforcement part, the expansion of the airbag in the upward or downward direction away from the second low-elasticity reinforcement part is suppressed, whereby the load from the airbag is more likely to be concentrated on the weakened part.

In the above aspect, preferably, the first low-elasticity reinforcement part is provided above and below the second low-elasticity reinforcement part.

According to this configuration, the expansion of the airbag in the upward and downward directions away from the second low-elasticity reinforcement part is suppressed by the first low-elasticity reinforcement parts. Thereby, the airbag is more likely to expand toward the weakened part and the load from the airbag is more likely to be concentrated on the weakened part.

In the above aspect, preferably, the first low-elasticity reinforcement part at least partially passes either one of above and below the airbag module in side view.

According to this configuration, it is possible to appropriately set the vertical spacing between the upper and lower first low-elasticity reinforcement parts. Thereby, the weakened part is easily teared and the airbag can be deployed stably.

In the above aspect, preferably, the first low-elasticity reinforcement part at least partially overlaps with the airbag module in side view.

According to this configuration, the upper and lower first low-elasticity reinforcement parts can be arranged close to the airbag before deployment, whereby the deployment of the airbag in the vertical direction can be limited by the first low-elasticity reinforcement parts more effectively and the load from the airbag can be concentrated on the weakened part.

In the above aspect, preferably, the first low-elasticity reinforcement part includes a first cloth member (101A, 101B) extending in the direction intersecting with the weakened part and joined to an inner surface of the skin member.

According to this configuration, the first low-elasticity reinforcement part can be configured easily.

In the above aspect, preferably, the first cloth member is joined to the inner surface of the skin member at a position spaced from the weakened part.

According to this configuration, part of the process for joining the first cloth member and the weakened part can be omitted.

In the above aspect, preferably, the second low-elasticity reinforcement part includes a second cloth member (103) positioned between the first cloth members and joined to a vicinity of the weakened part, and the second cloth member is joined to the skin member at a position closer to the weakened part than the first cloth members are.

According to this configuration, since the second cloth member is joined to the skin member at a position closer to the weakened part than the first cloth members, the load from the second cloth member is transmitted to the weakened part more easily, whereby the weakened part can be teared more promptly and the load from the first cloth members can be prevented from being transmitted to the weakened part.

In the above aspect, preferably, the skin member includes joint parts (95A) which are seams, and at least one of the joint parts is provided with a backing cloth (303).

According to this configuration, since the joint part is protected by the backing cloth, it is possible to prevent the skin member from being teared at a part not intended to be teared at the time of deployment of the airbag.

In the above aspect, preferably, each first low-elasticity reinforcement part extends forward along a side surface of the seat back on the vehicle outer side to reach a front surface of the seat back, each first low-elasticity reinforcement part intersects with the weakened part, and the first low-elasticity reinforcement parts are vertically connected to each other by the joint part provided with the backing cloth at positions closer to the front surface of the seat back than the weakened part is.

According to this configuration, the joint part can be protected by the backing cloth. Also, the first low-elasticity reinforcement parts are connected to each other by the low-elasticity part provided with the backing cloth on the front surface side of the seat back. Thereby, it is possible to effectively expand the airbag toward a part of the weakened part positioned between the first low-elasticity reinforcement parts so that the weakened part can be teared more promptly.

In the above aspect, preferably, the skin member includes a line fastener joining the two cloth members, and the second cloth member straddles the line fastener and is joined to the line fastener at a position spaced from the line fastener.

According to this configuration, the load from the second low-elasticity reinforcement part is difficult to be transmitted to the line fastener, and therefore, it is possible to prevent the line fastener from being teared.

In the above aspect, preferably, the first low-elasticity reinforcement part is provided with a sewing line extending in the direction intersecting with the weakened part.

According to this configuration, the configuration of the first low-elasticity reinforcement part is simplified.

To achieve the above object, a plate-shaped plate is joined to the skin member on a rear surface of the seat back, and the second cloth member is joined in a vicinity of the plate.

According to this configuration, the joining part of the skin member with the second low-elasticity reinforcement part is reinforced by the plate. Thereby, it is possible to prevent the skin member from being teared at a part not intended to be teared at the time of deployment of the airbag.

To achieve the above object, preferably, the seat back frame includes a pair of left and right side frames each extending vertically, the airbag module is joined to a side surface on the vehicle outer side of one of the side frames positioned on the vehicle outer side, the pad member includes a pad front portion positioned in front of the side frame positioned on the vehicle outer side, and the pad front portion is provided with a swelling part that swells rearward to reach the side surface on the vehicle outer side of the side frame positioned on the vehicle outer side.

According to this configuration, the swelling part prevents intrusion of the airbag between the pad front portion and the side frame at the time of deployment of the airbag. As a result, deployment of the airbag to the seat inner side is prevented and the airbag can be effectively expanded toward the seat outer side.

In the above aspect, preferably, the seat back frame includes a pair of left and right side frames each extending vertically, the airbag module is joined to the side surface on the vehicle outer side of one of the side frames positioned on the vehicle outer side, the vehicle seat includes a webbing (802) which has one end fixed to the side frame and is joined to an inner surface of the skin member at a part adjacent to the weakened part, the airbag module includes an airbag (71), an inflator (72) for causing the airbag to expand, and a case (73) accommodating the airbag and the inflator and provided with a lid member (73C) that opens toward the vehicle outer side when the airbag expands, and the webbing is in contact with an outer surface of the lid member.

According to this configuration, when the airbag expands and the lid of the case is opened toward the vehicle outer side, a load is applied to the webbing. Thereby, the load is transmitted to the weakened part more effectively and the weakened part can be teared more promptly at the time of deployment of the airbag.

Effect of the Invention

To achieve the above object, a vehicle seat provided with a seat cushion constituting a seating surface and a seat back constituting a backrest comprises: a seat back frame forming a structural member of the seat back; an airbag module supported on a side portion of the seat back frame on a vehicle outer side; a pad member covering the airbag module; and a skin member covering a surface of the pad member, wherein the skin member is provided with a weakened part vertically extending on an edge part of the seat back on the vehicle outer side and a first low-elasticity reinforcement part extending from a vicinity of the weakened part in a direction intersecting with the weakened part.

According to this configuration, when the airbag expands and reaches the first low-elasticity reinforcement part, the expansion of the airbag is suppressed by the first low-elasticity reinforcement part. Thereby, the deployment direction of the airbag is guided toward the weakened part, and therefore, the load from the airbag is more likely to be concentrated on the weakened part.

According to the configuration in which, in the above aspect, the skin member is provided with a second low-elasticity reinforcement part extending in the direction intersecting with the weakened part and having an end portion joined to a position adjacent to the weakened part, and the first low-elasticity reinforcement part is provided above or below the second low-elasticity reinforcement part, when a load is applied to the second low-elasticity reinforcement part due to expansion of the airbag, the load is transmitted to the weakened part. Therefore, the load is likely to be applied to the weakened part and this facilitates tearing of the weakened part. Also, since the first low-elasticity reinforcement part is provided above or below the second low-elasticity reinforcement part, the expansion of the airbag in the upward or downward direction away from the second low-elasticity reinforcement part is suppressed, whereby the load from the airbag is more likely to be concentrated on the weakened part.

According to the configuration in which, in the above aspect, the first low-elasticity reinforcement part is provided above and below the second low-elasticity reinforcement part, the expansion of the airbag in the upward and downward directions away from the second low-elasticity reinforcement part is suppressed by the first low-elasticity reinforcement parts. Thereby, the airbag is more likely to expand toward the weakened part and the load from the airbag is more likely to be concentrated on the weakened part.

According to the configuration in which, in the above aspect, the first low-elasticity reinforcement part at least partially passes either one of above and below the airbag module in side view, it is possible to appropriately set the vertical spacing between the upper and lower first low-elasticity reinforcement parts. Thereby, the weakened part is easily teared and the airbag can be deployed stably.

According to the configuration in which, in the above aspect, the first low-elasticity reinforcement part at least partially overlaps with the airbag module in side view, the upper and lower first low-elasticity reinforcement parts can be arranged close to the airbag before deployment, whereby the deployment of the airbag in the vertical direction can be limited by the first low-elasticity reinforcement parts more effectively and the load from the airbag can be concentrated on the weakened part.

According to the configuration in which, in the above aspect, the first low-elasticity reinforcement part includes a first cloth member extending in the direction intersecting with the weakened part and joined to an inner surface of the skin member, the first low-elasticity reinforcement part can be configured easily.

According to the configuration in which, in the above aspect, the first cloth member is joined to the inner surface of the skin member at a position spaced from the weakened part, part of the process for joining the first cloth member and the weakened part can be omitted.

According to the configuration in which, in the above aspect, the second low-elasticity reinforcement part includes a second cloth member positioned between the first cloth members and joined to a vicinity of the weakened part, and the second cloth member is joined to the skin member at a position closer to the weakened part than the first cloth members are, since the second cloth member is joined to the skin member at a position closer to the weakened part than the first cloth members, the load from the second cloth member is transmitted to the weakened part more easily, whereby the weakened part can be teared more promptly and the load from the first cloth members can be prevented from being transmitted to the weakened part.

According to the configuration in which, in the above aspect, the skin member includes joint parts which are seams, and at least one of the joint parts is provided with a backing cloth, since the joint part is protected by the backing cloth, it is possible to prevent the skin member from being teared at a part not intended to be teared at the time of deployment of the airbag.

According to the configuration in which, in the above aspect, each first low-elasticity reinforcement part extends forward along a side surface of the seat back on the vehicle outer side to reach a front surface of the seat back, each first low-elasticity reinforcement part intersects with the weakened part, and the first low-elasticity reinforcement parts are vertically connected to each other by the joint part provided with the backing cloth at positions closer to the front surface of the seat back than the weakened part is, the joint part can be protected by the backing cloth. Also, the first low-elasticity reinforcement parts are connected to each other by the low-elasticity part provided with the backing cloth on the front surface side of the seat back. Thereby, it is possible to effectively expand the airbag toward a part of the weakened part positioned between the first low-elasticity reinforcement parts so that the weakened part can be teared more promptly.

According to the configuration in which, in the above aspect, the skin member includes a line fastener joining the two cloth members, and the second cloth member straddles the line fastener and is joined to the line fastener at a position spaced from the line fastener, the load from the second low-elasticity reinforcement part is difficult to be transmitted to the line fastener, and therefore, it is possible to prevent the line fastener from being teared.

According to the configuration in which, in the above aspect, the first low-elasticity reinforcement part is provided with a sewing line extending in the direction intersecting with the weakened part, the configuration of the first low-elasticity reinforcement part is simplified.

According to the configuration in which, to achieve the above object, a plate-shaped plate is joined to the skin member on a rear surface of the seat back, and the second cloth member is joined in a vicinity of the plate, the joining part of the skin member with the second low-elasticity reinforcement part is reinforced by the plate. Thereby, it is possible to prevent the skin member from being teared at a part not intended to be teared at the time of deployment of the airbag.

According to the configuration in which, to achieve the above object, the seat back frame includes a pair of left and right side frames each extending vertically, the airbag module is joined to a side surface on the vehicle outer side of one of the side frames positioned on the vehicle outer side, the pad member includes a pad front portion positioned in front of the side frame positioned on the vehicle outer side, and the pad front portion is provided with a swelling part that swells rearward to reach the side surface on the vehicle outer side of the side frame positioned on the vehicle outer side, the swelling part prevents intrusion of the airbag between the pad front portion and the side frame at the time of deployment of the airbag. As a result, deployment of the airbag to the seat inner side is prevented and the airbag can be effectively expanded toward the seat outer side.

According to the configuration in which, in the above aspect, the seat back frame includes a pair of left and right side frames each extending vertically, the airbag module is joined to the side surface on the vehicle outer side of one of the side frames positioned on the vehicle outer side, the vehicle seat includes a webbing which has one end fixed to the side frame and is joined to an inner surface of the skin member at a part adjacent to the weakened part, the airbag module includes an airbag, an inflator for causing the airbag to expand, and a case accommodating the airbag and the inflator and provided with a lid member that opens toward the vehicle outer side when the airbag expands, and the webbing is in contact with an outer surface of the lid member, when the airbag expands and the lid of the case is opened toward the vehicle outer side, a load is applied to the webbing. Thereby, the load is transmitted to the weakened part more effectively and the weakened part can be teared more promptly at the time of deployment of the airbag.

BRIEF DESCRIPTION OF THE DRAWINGS

FIG. 21 is the vehicle seat according to the fifth embodiment a modification of.

MODE(S) FOR CARRYING OUT THE INVENTION

In the following, embodiments in which a vehicle seat according to the present invention is applied to a vehicle seat to be installed in an automobile will be described with reference to the drawings.

First Embodiment

Figure 1:
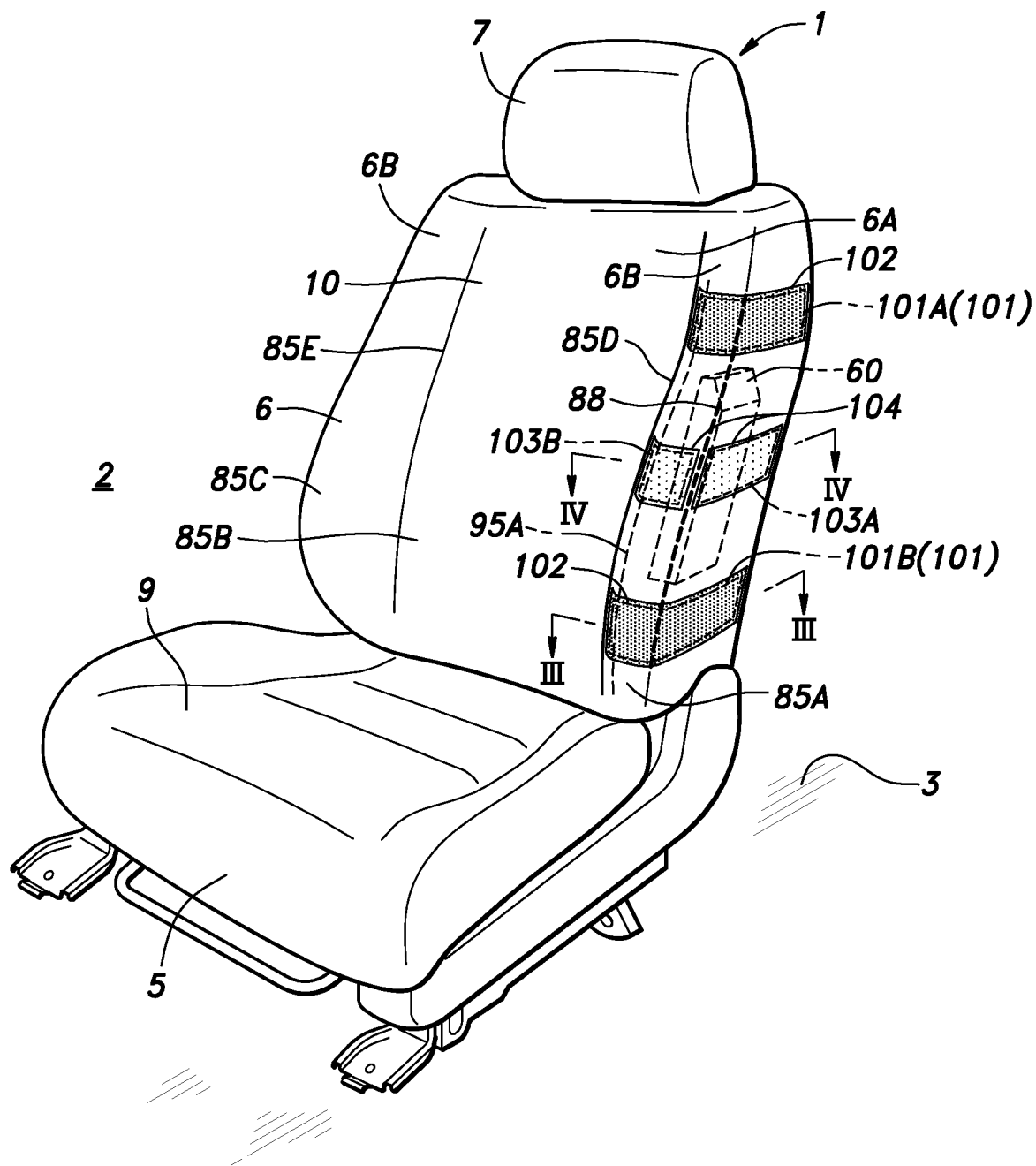
FIG. 1 is a perspective view of a vehicle seat according to the first embodiment.

As shown in FIG. 1, a vehicle seat 1 according to the first embodiment is placed on a floor 3 defining a bottom portion of a cabin 2 so as to face forward with respect to the vehicle (more specifically, such that the seated occupant faces forward with respect to the vehicle). The vehicle seat 1 is supported on the floor 3 to be slidingly movable in the fore and aft direction. In the present embodiment, the vehicle seat 1 constitutes a front passenger seat disposed next to the driver's seat. In the following description, the front-rear, left-right, and up-down directions are defined with respect to the direction as seen from the occupant seated on the vehicle seat 1. Also, in the following, description will be made on the basis of a state in which the backrest is in a substantially vertically upright state relative to the floor 3.

The vehicle seat 1 is provided with a seat cushion 5 for supporting the buttocks of the seated person, a seat back 6 provided on a rear portion of the seat cushion 5 to function as a backrest, and a headrest 7 provided on an upper portion of the seat back 6.

The seat cushion 5 is in a substantially rectangular parallelepiped shape having a surface facing substantially in the vertical direction. An upper surface of the seat cushion 5 constitutes a seating surface 9 for one occupant. The seating surface 9 is depressed downward substantially at the center with respect to the lateral direction and is inclined slightly downward toward the rear. Thereby, the seating surface 9 has a shape corresponding to the buttocks and the thighs of the occupant. When the occupant is seated, the buttocks and the thighs of the occupant are placed on the seating surface 9.

The seat back 6 includes a seat back central part 6A extending in the vertical direction and a pair of bolster parts 6B respectively provided on left and right sides of the seat back central part 6A. The seat back central part 6A is in a substantially rectangular parallelepiped shape having a surface facing substantially in the fore and aft direction. The front surface of the seat back central part 6A constitutes a backrest surface 10 for supporting the back of the occupant. The backrest surface 10 is depressed rearward substantially at the center with respect to the lateral direction and is inclined slightly rearward toward the top. Thereby, the backrest surface 10 has a shape corresponding to the back of the occupant, and the back of the occupant is supported on the backrest surface 10. Each of the bolster parts 6B protrudes more forward in a lower portion and supports the upper body of the occupant from the side.

Figure 2:
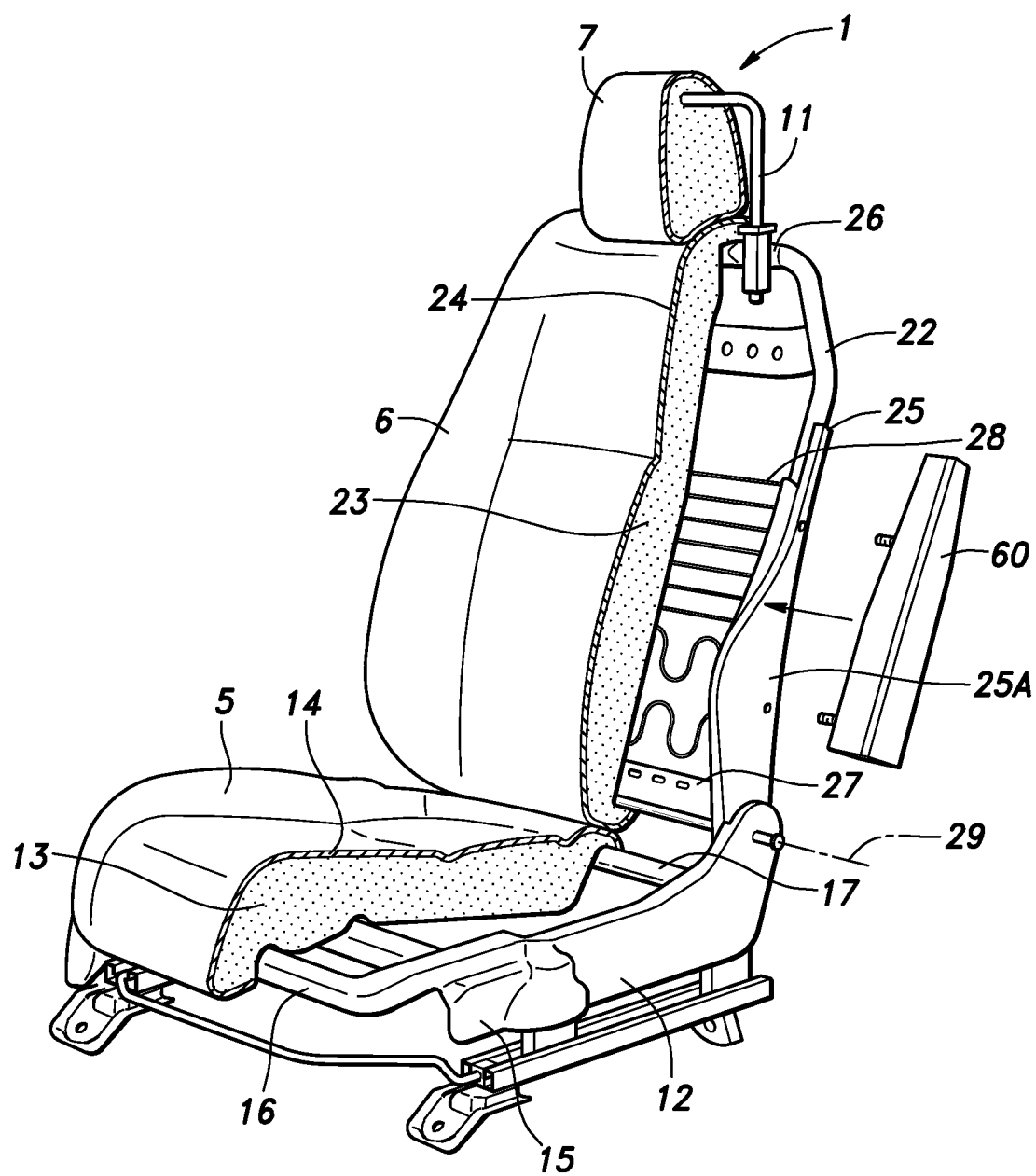
FIG. 2 is an exploded perspective view of the vehicle seat according to the first embodiment.

The headrest 7 is connected to the upper end of the seat back 6 via two pillars 11 (see FIG. 2). The headrest 7 is disposed at a position behind the head of the seated occupant.

As shown in FIG. 2, the seat cushion 5 includes a metal frame (seat cushion frame 12) forming a skeleton, a pad member 13 (see FIG. 1) supported on the seat cushion frame 12, and a skin member 14 (see FIG. 1) covering the pad member 13.

The seat cushion frame 12 is a structural member forming the shape of the seat cushion 5 and includes a pair of left and right side frames 15 (cushion side frames) each extending in the fore and aft direction, a front frame 16 (cross frame) extending between front portions of the side frames 15, and a rear frame 17 (cross frame) extending between rear portions of the side frames 15 so that the seat cushion frame 12 has a substantially rectangular frame shape. In the present embodiment, the left and right side frames 15 of the seat cushion 5 are each in a plate shape having a surface facing in the lateral direction. The seat cushion frame 12 may further include a plate-shaped pan frame (not shown in the drawings) extending laterally between the pair of left and right side frames 15 and a wire member (not shown in the drawings) extending between the front frame 16 and the rear frame 17. The pad member 13 of the seat cushion 5 is disposed on an upper side of the seat cushion frame 12. As shown in FIG. 1, an upper surface of the pad member 13 is covered the skin member 14.

Similarly to the seat cushion 5, the seat back 6 includes a metal frame (hereinafter, a seat back frame 22) forming a skeleton, a pad member 23 (see FIG. 1) supported on the seat back frame 22, and a skin member 24 (see FIG. 1) covering the pad member 23.

The seat back frame 22 is a structure member forming the shape of the seat back 6 and includes a pair of left and right side frames (back side frames 25) each extending vertically, an upper frame 26 extending between upper portions of the back side frames 25, and a lower frame 27 extending between lower portions of the back side frames 25 so that the seat back frame 22 has a substantially rectangular frame shape. Pressure receiving members 28, each being formed of a wire-shaped member, extend between the left and right back side frames 25. When a rearward load is applied from the occupant, the pressure receiving members 28 flex and support the back of the occupant from the rear. The pad member 23 is disposed to cover the front surface and the left and right side surfaces of the seat back frame 22 from the front side of the seat back frame 22. The front surface and the left and right side surfaces of the pad member 23 are covered by the skin member 24.

The rear portions of the side frames 15 (cushion side frames) of the seat cushion 5 laterally oppose each other via lower portions of the two back side frames 25. A single tilt axis 29 extending in the lateral direction (vehicle width direction) passes through the lower portions of the left and right back side frames 25 of the seat back 6 and the rear portions of the left and right side frames 15 of the seat cushion 5. The lower portions of the left and right back side frames 25 of the seat back 6 are joined to the rear portions of the corresponding side frames 15 of the seat cushion 5 to be pivotable about the tilt axis 29 (see FIG. 1). More specifically, the seat back frame 22 and the seat cushion frame 12 are pivotably coupled to each other via the tilt axis 29 so that the seat back frame 22 can be tilted (pivoted) about the tilt axis 29 relative to the seat cushion frame 12.

A reclining mechanism may be provided between the seat cushion frame 12 and the seat back frame 22. Thereby, the occupant can adjust the tilt angle of the seat back 6 relative to the seat cushion 5 by operating an operation lever of reclining mechanism.

When the backrest surface 10 is in the most upright state, namely, a state in which the backrest surface 10 is closest to the vertical direction (see FIG. 1), the back side frames 25 of the seat cushion 5 extend substantially in the vertical direction. In the following, description will be made on the basis of the state in which the backrest surface 10 is in the most upright state and the seat back 6 extends substantially in the vertical direction in side view (as viewed in the lateral direction).

As shown in FIG. 1, the left one of the back side frames 25 (hereinafter, the left back side frame 25A) of the seat back 6 is provided with an airbag module 60. The airbag module 60 is in a substantially rectangular parallelepiped shape. The airbag module 60 has surfaces facing forward, rearward, leftward, rightward, upward, and downward, and is disposed along an extension direction of the left back side frame 25A. The airbag module 60 is joined substantially to the center of the left side surface of the left back side frame 25A with respect to the vertical direction and is supported by the left back side frame 25A.

In the present embodiment, the width of the airbag module 60 in the fore and aft direction and the width of the left back side frame 25A in the fore and aft direction are substantially the same. Also, the front edge of the airbag module 60 is substantially aligned with the front edge of the left back side frame 25A in the fore and aft direction.

Figure 3:
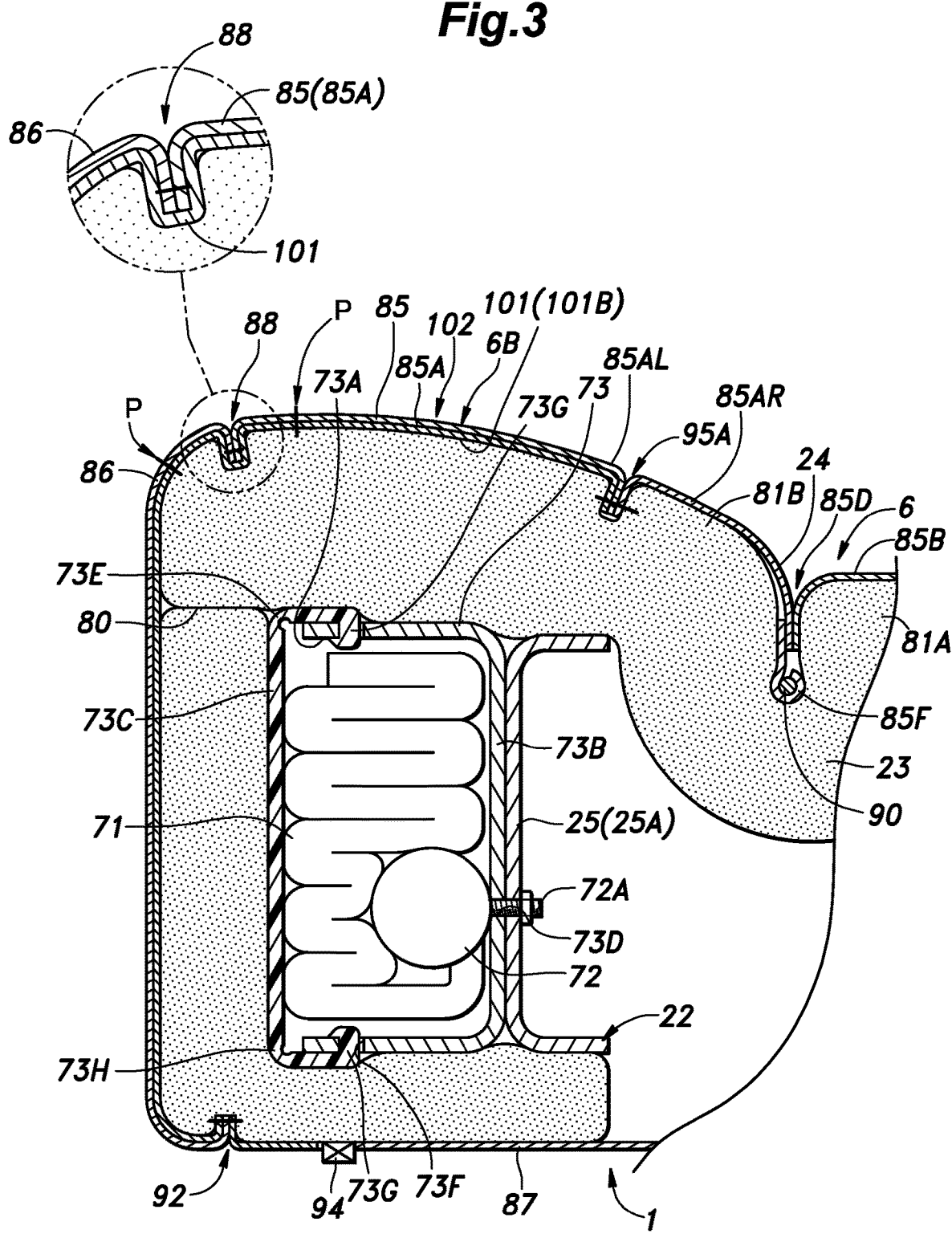
FIG. 3 is a sectional view of FIG. 1.
Figure 4:
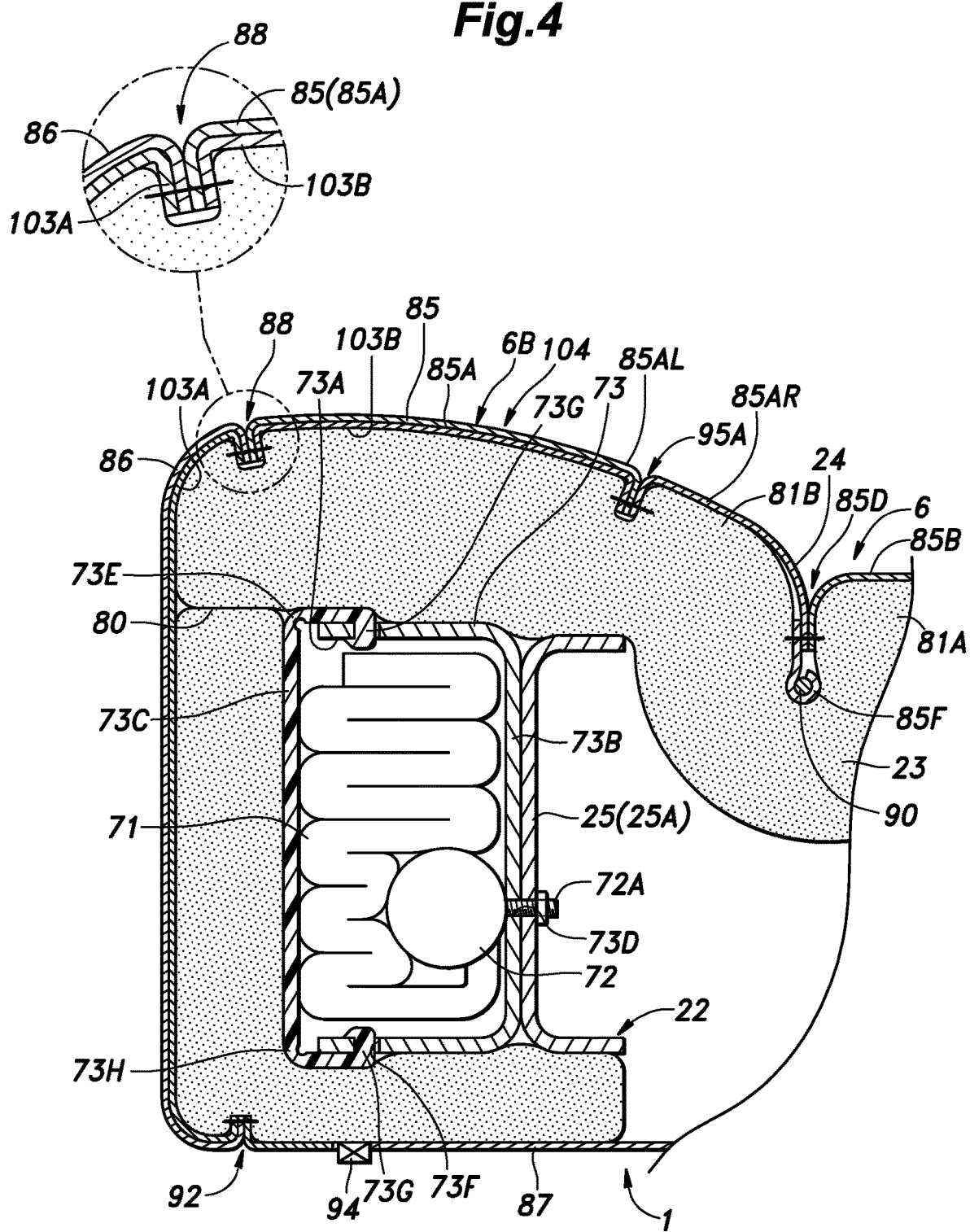
FIG. 4 is a IV-IV sectional view of FIG. 1.

The airbag module 60 is a module for deploying an airbag 71 (a so-called side airbag) to a vehicle outer side of the occupant seated on the vehicle seat 1. As shown in FIGS. 3 and 4, the airbag module 60 includes an airbag 71, an inflator 72 for generating gas inside the airbag 71 to expand (deploy) the airbag 71, and a case 73 accommodating the airbag 71 and the inflator 72.

Figure 5:
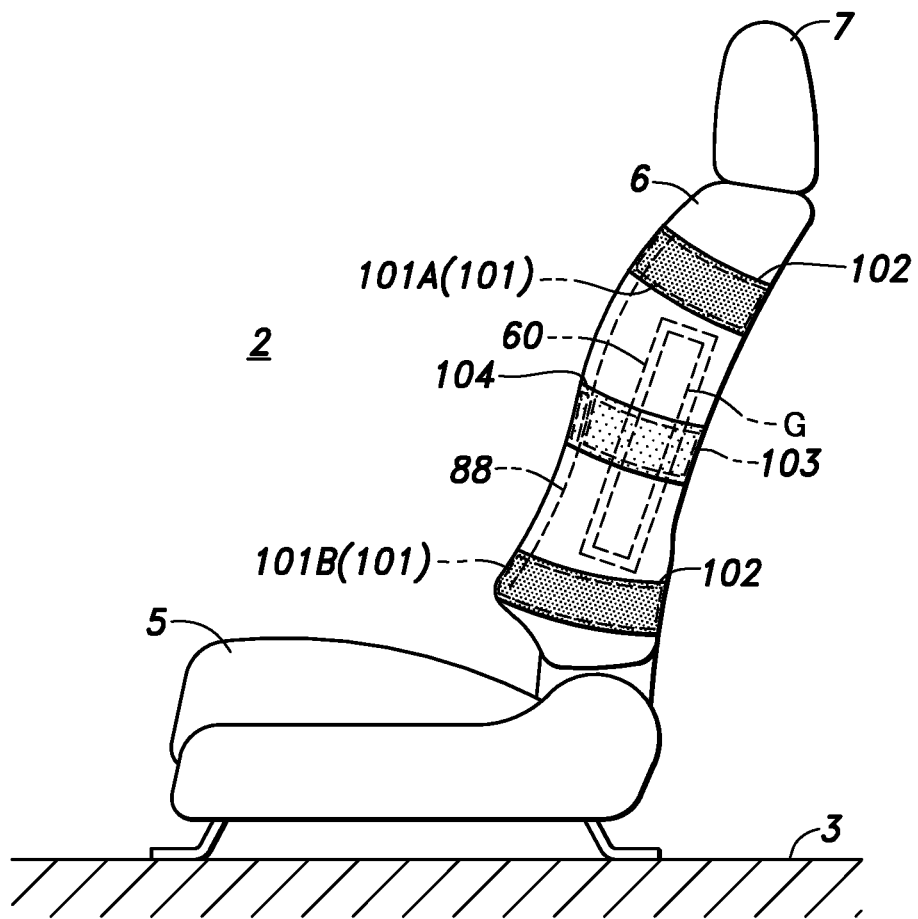
FIG. 5 is a side view of the vehicle seat according to the first embodiment.

The airbag 71 is a bag-shaped member, and when the gas generated by the inflator 72 is supplied to the inside thereof, expands in the vertical direction and obliquely forward toward the vehicle outer side (left side) to be deployed to the vehicle outer side of the upper body of the occupant seated on the vehicle seat 1. In FIG. 5, the position G of the airbag 71 before deployment is indicated by a broken line. As shown in FIG. 5, since the airbag 71 is accommodated inside the case 73, the airbag 71 before deployment overlaps with the airbag module 60 in side view. Namely, the airbag 71 before deployment is positioned between the upper edge and the lower edge of the airbag module 60 in side view.

The inflator 72 has a cylindrical columnar shape and is provided with a male screw 72A protruding radially outward from the outer circumferential surface thereof.

The case 73 is a box member having a substantially rectangular parallelepiped shape. The case 73 includes a case main body 73B in a bottomed rectangular cylinder shape having an opening 73A and a lid member 73C made of resin and covering the opening 73A of the case main body 73B. The bottom wall of the case main body 73B is formed with a through hole 73D through which the male screw 72A of the inflator 72 passes. The lid member 73C is a substantially rectangular plate-shaped member and is formed with a frangible part 73E that is ruptured when the airbag 71 expands. In the present embodiment, the frangible part 73E is formed along an outer edge of one side of the lid member 73C as a part having a smaller wall thickness than the other part. An opening edge of the case main body 73B is provided with locking holes 73F penetrating therethrough in the thickness direction, and the lid member 73C is provided with locking claws 73G engaged with the respective locking holes 73F. The airbag 71 and the inflator 72 are accommodated inside the case main body 73B, with the airbag 71 being folded and the inflator 72 being disposed such that the male screw 72A passes the through hole 73D to protrude from the case main body 73B. The locking claws 73G are engaged with the locking holes 73F, whereby the lid member 73C is joined to the case main body 73B. The lid member 73C closes the opening 73A of the case main body 73B.

With the male screw 72A of the inflator 72 being fastened to the left back side frame 25A, the airbag module 60 is joined to the left side surface of the left back side frame 25A. At this time, as shown in FIGS. 2 and 3, the frangible part 73E of the lid member 73C is positioned at the left front edge of the airbag module 60. In the present embodiment, the lid member 73C is further provided with a hinge axis portion 73H extending vertically along the left rear edge. The hinge axis portion 73H has a wall thickness greater than the wall thickness of the frangible part 73E but smaller than the wall thickness of the other part. After the frangible part 73E is ruptured, the lid member 73C is caused to rotate to the left about the hinge axis portion 73H by the expansion of the airbag 71 so that the case main body 73B is opened.

As shown in FIG. 2, the pad member 23 covers the front side, left and right outer sides, and, the upper side of the seat back frame 22. As shown in FIG. 3, the pad member 23 includes a front central part 81A disposed on the front side of the seat back frame 22 at a position corresponding to the backrest surface 10, a left side part 81B positioned on the left of the front central part 81A and swelling forward, and a right side part (not shown in the drawings) positioned on the right of the front central part 81A and swelling forward. The front central part 81A constitutes the seat back central part 6A, and the left side part 81B and the right side part respectively constitute the bolster parts 6B.

The airbag module 60 is covered by the left side part 81B from the front side, rear side, upper side, lower side, and vehicle outer side (left side). The left side part 81B is provided with a slit 80 that penetrates therethrough in the thickness direction at a part positioned on the left of the front edge of the airbag module 60. Note that the position where the slit 80 is provided is not limited to the left of the front edge of the airbag module 60, and it may be provided on the left side of the airbag module 60 or to the left front of the front edge. The slit 80 is provided to extend vertically on the left side surface of the left side part 81B. The upper end of the slit 80 is positioned higher than the upper end of the airbag module 60, and the lower end is positioned lower than the lower end of the airbag module 60.

The surface of the pad member 23 is covered by the skin member 24 which is bag-shaped. The skin member 24 includes a front skin member 85 covering the front surface of the pad member 23, a left skin member 86 (vehicle-outer-side skin member) covering the left side surface of the pad member 23, a right skin member (not shown in the drawings) covering the right side surface of the pad member 23, and an upper skin member (not shown in the drawings) covering the upper surface of the pad member 23. In the present embodiment, the skin member 24 includes a rear skin member 87 laterally connecting the right skin member and the left skin member 86 and covering a rear side of the seat back frame 22. The left side part 81B is covered by the front skin member 85 from the front side, is covered by the left skin member 86 from the left side, and is covered by the rear skin member 87 from the rear side.

As shown in the enlarged views of FIGS. 3 and 4, the front skin member 85 and the left skin member 86 are sutured to each other to form a sutured part 88. The sutured part 88 is provided on a part of either the vehicle-outer-side side surface (left side surface) of the seat back 6 or the vehicle-outer-side edge part including the vehicle-outer-side edge part (left edge) of the front surface of the seat back 6. In the present embodiment, as shown in FIG. 1, the sutured part 88 is provided along the left edge of the front surface of the seat back 6. The sutured part 88 extends vertically along the outer surface of the seat back 6. The sutured part 88 functions as a weakened part (also referred to as a tearable part) that is teared when a predetermined load or greater is applied from the inner side of the seat back 6 as a result of expansion of the airbag 71.

As shown in FIGS. 1 and 5, the sutured part 88 extends vertically along the left front edge of the seat back 6. As shown in FIG. 5, the upper end of the sutured part 88 is positioned higher than the upper edge of the airbag 71 before deployment, and the lower end of the sutured part 88 is positioned lower than the lower edge of the airbag 71 before deployment. In the present embodiment, the upper end of the sutured part 88 is positioned higher than the upper end of the airbag module 60 in side view, and the lower end of the sutured part 88 is positioned lower than the lower end of the airbag module 60 in side view. The sutured part 88 may extend from the upper end to the lower end of the vehicle-outer-side side surface of the left side part 81B. The sutured part 88 is positioned in front of the slit 80 and in the vicinity of the left end of the front surface of the left side part 81B.

In the present embodiment, the front skin member 85 is configured by joining together multiple cloth members. More specifically, as shown in FIGS. 3 and 4, the front skin member 85 includes a left cloth member 85A constituting the left edge thereof and provided on the front surface of the left one of the bolster parts 6B, a middle cloth member 85B covering the front surface of the front central part 81A of the pad member 23, and a right cloth member 85C (see FIG. 1) provided on the front surface of the right one of the bolster parts 6B. The right edge of the left cloth member 85A is sutured to the right edge of the middle cloth member 85B, and the left edge of the right cloth member 85C is sutured to the left edge of the middle cloth member 85B.

As shown in FIG. 1, the sutured part between the left cloth member 85A and the middle cloth member 85B extends vertically along the right edge of the left one of the bolster parts 6B, and the sutured part between the right cloth member 85C and the middle cloth member 85B extends vertically along the left edge of the right one of the bolster parts 6B. As shown in FIGS. 3 and 4, on the inner surface of the front skin member 85, the sutured part between the left cloth member 85A and the middle cloth member 85B (hereinafter, a left tucking part 85D) and the sutured part between the right cloth member 85C and the middle cloth member 85B (hereinafter, a right tucking part 85E) are each provided with multiple hooks 85F arranged vertically. Between the front central part 81A and the left side part 81B and between the front central part 81A and the right side part of the pad member 23, vertically extending wire members 90 are respectively provided. The hooks 85F are each engaged with the wire member 90.

The rear edge of the left skin member 86 and the left edge of the rear skin member 87 are sutured to each other to constitute a left rear joint part 92 which is a seam extending vertically at the left edge of the rear surface of the seat back 6. In other words, the left skin member 86 and the rear skin member 87 are joined to each other at the left rear joint part 92. Similarly, the rear edge of the right skin member and the right edge of the rear skin member 87 are sutured to each other to constitute a right rear joint part (not shown in the drawings) which is a seam extending vertically at the right edge of the rear surface of the seat back 6. Further, in the present embodiment, to facilitate the assembly of the skin member 24, vertically extending line fasteners 94 are provided in the vicinity of the left edge and the right edge of the rear skin member 87, respectively.

The left cloth member 85A and the right cloth member 85C are each configured by joining together multiple cloth members. In the present embodiment, as shown in FIGS. 3 and 4, the left cloth member 85A is configured by joining together a first left cloth member 85AL forming the left half thereof and a second left cloth member 85AR forming the right half thereof. As shown in FIG. 1, the left cloth member 85A is formed with a left front joint part 95A (see FIG. 3), which is a seam between the first left cloth member 85AL and the second left cloth member 85AR, such that the left front joint part 95A extends vertically. The right cloth member 85C also is configured by joining together a first right cloth member forming the right half thereof and a second right cloth member forming the left half thereof. The right cloth member 85C is provided with a right front joint part (not shown in the drawings), which is a seam between the first right cloth member and the second right cloth member, such that the right front joint part extends vertically.

As shown in FIG. 3, a pair of upper and lower reinforcement cloths 101 (first cloth members) are joined to the inner surface of the skin member 24. Each reinforcement cloth 101 is a strip-shaped cloth member and is preferably made of a material that is more difficult to stretch than the material of the skin member 24. The reinforcement cloth 101 has one end sutured to the left front joint part 95A. The reinforcement cloth 101 extends leftward from the left front joint part 95A and passes the back side of the sutured part 88 (see the enlarged view in FIG. 4) to reach the left front edge of the pad member 23. The reinforcement cloth 101 further extends rearward along the left side surface of the pad member 23 and passes above (or below) the airbag module 60 in side view (see FIG. 5) to reach the left rear edge of the pad member 23. Then, the reinforcement cloth 101 extends rightward and is sutured to the left rear joint part 92 at the other end thereof. As shown in FIG. 5, the two reinforcement cloths 101 are disposed to be spaced above and below the airbag module 60 (namely, the position G of the airbag 71 before deployment) in side view and to constitute an up and down pair. In the following, the reinforcement cloth 101 positioned on the upper side will be referred to as an upper reinforcement cloth 101A and the reinforcement cloth 101 positioned on the lower side will be referred to as a lower reinforcement cloth 101B.

As shown in FIG. 1, each reinforcement cloth 101 extends in a direction intersecting with the sutured part 88. Except for a part in the vicinity of the sutured part 88, the reinforcement cloth 101 is sutured to the skin member 24 along the outer peripheral edge thereof (backing). As shown in FIG. 3, the reinforcement cloth 101 is further sutured at positions P spaced from the sutured part 88 in both left and right directions and passes the back side of the sutured part 88. With such configuration, in the process of suturing the reinforcement cloth 101 to the skin member 24, a step of suturing the reinforcement cloth 101 to the vicinity of the sutured part 88 of the skin member 24 and a step of suturing the reinforcement cloth 101 to the sutured part 88 can be omitted, whereby the manufacturing efficiency of the vehicle seat 1 can be improved.

The parts of the skin member 24 provided with the reinforcement cloths 101 each function as a first low-elasticity reinforcement part 102 which is difficult to be ruptured and has low elasticity (more specifically, difficult to stretch and has stretch resistance) compared to the part that is not backed by the cloth members. As shown in FIG. 5, the first low-elasticity reinforcement parts 102 are formed to constitute an up and down pair. Each of the first low-elasticity reinforcement parts 102 extends from the vicinity of the sutured part 88 in the direction intersecting with the sutured part 88. The first low-elasticity reinforcement part 102 on the upper side extends in the fore and aft direction on the left side surface of the seat back 6 and passes above the position G of the airbag 71 before deployment in side view. The first low-elasticity reinforcement part 102 on the lower side also extends in the fore and aft direction on the left side surface of the seat back 6 and passes below the position G of the airbag 71 before deployment in side view.

Further, a strip-shaped webbing 103 (second cloth member) is joined to the inner surface of the skin member 24. In the present embodiment, the webbing 103 includes two cloth members (hereinafter, the first webbing 103A and the second webbing 103B). The first webbing 103A and the second webbing 103B are each constituted of a cloth member made of a material similar to that of the reinforcement cloths 101.

The first webbing 103A is sutured to the left side of the sutured part 88, which is the inner surface of the left skin member 86, at one end (hereinafter, the inner end) thereof. In the present embodiment, the first webbing 103A is sutured to the front skin member 85 together with the left skin member 86. As shown in FIG. 4, the first webbing 103A extends leftward from the inner end to reach the left front edge of the pad member 23. The first webbing 103A further extends rearward along the left side surface of the pad member 23, passes to overlap with a substantially central part of the airbag module 60 with respect to the vertical direction (see FIG. 5), and reaches the left rear edge of the pad member 23. The first webbing 103A further extends rightward and is sutured to the rear end inner surface of the left skin member 86, more specifically, to the left rear joint part 92, at the other end (hereinafter, the outer end) thereof.

The second webbing 103B has one end (hereinafter, the inner end) sutured to the right side of the sutured part 88, which is the inner surface of the front skin member 85. In the present embodiment, the second webbing 103B is sutured to the left skin member 86 together with the front skin member 85 to constitute the sutured part 88. As shown in FIG. 1, the inner end of the second webbing 103B and the inner end of the first webbing 103A oppose each other via a vertically central portion of the sutured part 88 (hereinafter, the intermediate portion). As shown in FIG. 4, the second webbing 103B extends rightward from the inner end and then extends rearward along the outer surface of the left side part 81B to be sutured to the part in the vicinity of the left front joint part 95A at the other end (hereinafter, the outer end) thereof. In the present embodiment, since the inner end of the first webbing 103A and the inner end of the second webbing 103B are sutured to the sutured part 88, the distance between the inner end of the first webbing 103A and the sutured part 88 is substantially the same as the distance between the inner end of the second webbing 103B and the sutured part 88.

Each of the first webbing 103A and the second webbing 103B is sutured to the skin member 24 along the outer peripheral edge (backing). Thereby, the part of the skin member 24 provided with the first webbing 103A and the part of the skin member 24 provided with the second webbing 103B each function as a second low-elasticity reinforcement part 104 which is difficult to be ruptured and has low elasticity (more specifically, difficult to stretch and has stretch resistance) compared to the part not backed by the cloth members. As shown in FIG. 1, the second low-elasticity reinforcement part 104 extends in the lateral direction (namely, in the direction intersecting with the sutured part 88) in the vicinity of the intermediate portion of the sutured part 88. The second low-elasticity reinforcement part 104 is constituted of two strips arranged along the outer surface of the pad member 23 via the sutured part 88 and has two end portions adjoining to either side of the sutured part 88.

Each of the upper reinforcement cloth 101A and the lower reinforcement cloth 101B is sutured to the skin member 24 at the positions P spaced from the sutured part 88 (see FIG. 3). In the present embodiment, the upper reinforcement cloth 101A and the lower reinforcement cloth 101B are sutured to the skin member 24 at positions having the same distance from the sutured part 88. The distance between the part where the upper reinforcement cloth 101A and the skin member 24 are sutured and the sutured part 88 is greater than the distance between the inner end of the first webbing 103A (the part where the first webbing 103A is sutured) and the sutured part 88. Namely, the upper reinforcement cloth 101A (or the lower reinforcement cloth 101B) is in the position more distant from the sutured part 88 than the first webbing 103A (or the second webbing 103B) is. As a result, the load applied to the reinforcement cloths 101 (the upper reinforcement cloth 101A, the lower reinforcement cloth 101B) is more difficult to be transmitted to the sutured part 88 than the load applied to the webbing 103 (the first webbing 103A, the second webbing 103B).

Next, effects of the vehicle seat 1 thus configured will be described. When the gas is ejected from the inflator 72, the airbag 71 expands. As a result, a leftward load is applied to the lid member 73C of the airbag module 60 from the airbag 71, and the frangible part 73E is ruptured. Thereby, the lid member 73C rotates leftward about the hinge axis portion 73H provided at the rear end, and the case 73 is opened. Thereafter, the airbag 71 expands to the outside of the case 73 and passes the slit 80 to reach the skin member 24. At this time, a load is applied from the airbag 71 to the skin member 24 to spread the skin member 24 from the inside to the outside of the seat.

Further, the airbag 71 expands toward the vertical direction from the position G of the airbag 71 before deployment in side view while being in contact with the skin member 24, and the upper end and the lower end thereof reach the respective first low-elasticity reinforcement parts 102.

Since the first low-elasticity reinforcement parts 102 are more difficult to stretch than the parts of the skin member 24 excluding the second low-elasticity reinforcement part 104, the first low-elasticity reinforcement parts 102 are difficult to spread to the seat outer side compared to the other parts of the skin member 24 excluding the second low-elasticity reinforcement part 104. As a result, the expansion of the airbag 71 is suppressed at the first low-elasticity reinforcement parts 102. Thereby, the deployment direction of the airbag 71 is guided toward the sutured part 88 and hence the load from the airbag 71 tends to be concentrated on the sutured part 88. As a result, the sutured part 88 can be teared more promptly and the airbag 71 can be deployed more promptly.

After passing the slit 80, the airbag 71 reaches the second low-elasticity reinforcement part 104. At this time, a load is applied from the airbag 71 to the second low-elasticity reinforcement part 104 to spread second low-elasticity reinforcement part 104 from the inside to the outside of the seat. Since the second low-elasticity reinforcement part 104 is more difficult to stretch than the other parts excluding the first low-elasticity reinforcement parts 102, the load is concentrated on the sutured part 88 which is easier to stretch than the second low-elasticity reinforcement part 104. As a result, the sutured part 88 is easily teared by the expansion of the airbag 71 and the airbag 71 can be deployed more promptly.

Also, since the first low-elasticity reinforcement parts 102 are provided above and below the second low-elasticity reinforcement part 104, the expansion of the airbag 71 in the upward or downward direction away from the second low-elasticity reinforcement part 104 is suppressed. As a result, the load from the airbag 71 is more likely to be concentrated on the sutured part 88.

The first low-elasticity reinforcement parts 102 and the second low-elasticity reinforcement part 104 each can be formed by suturing a cloth member to the skin member 24, and therefore, it is possible to easily provide the skin member 24 with parts having low elasticity.

The upper reinforcement cloth 101A (or the lower reinforcement cloth 101B) is more separated from the sutured part 88 than the first webbing 103A (or the second webbing 103B) is. As a result, the load applied to the first low-elasticity reinforcement parts 102 due to the expansion of the airbag 71 is less likely to be transmitted to the sutured part 88 compared to the load applied to the second low-elasticity reinforcement part 104. Thereby, tearing of the sutured part 88 from the vicinity of the upper end portion or the vicinity of the lower end portion can be prevented. Thus, it is possible to cause the sutured part 88 to be teared from the substantially central part with respect to the vertical direction so that the airbag 71 is deployed more promptly and properly.

In addition, as shown in FIG. 5, the first low-elasticity reinforcement part 102 on the upper side is positioned above the airbag module 60 and the first low-elasticity reinforcement part 102 on the lower side is positioned below the airbag module 60 in side view. By thus disposing each of the first low-elasticity reinforcement parts 102 above or below the airbag module 60, it is possible to appropriately set the spacing between the upper and lower first low-elasticity reinforcement parts 102. Thereby, it becomes easy for the part between the first low-elasticity reinforcement parts 102 above and below the skin member 24 to be pushed out to the seat outer side by the airbag 71. As a result, the sutured part 88 is easily teared and the airbag 71 can be deployed more stably.

Second Embodiment

The vehicle seat 201 according to the second embodiment differs from the first embodiment with respect to the positions of the reinforcement cloths 101, and accordingly, the position of the first low-elasticity reinforcement parts 102 differ from the first embodiment. The other configurations are the same as in the first embodiment. Therefore, description of the other configurations will be omitted.

Figure 6:
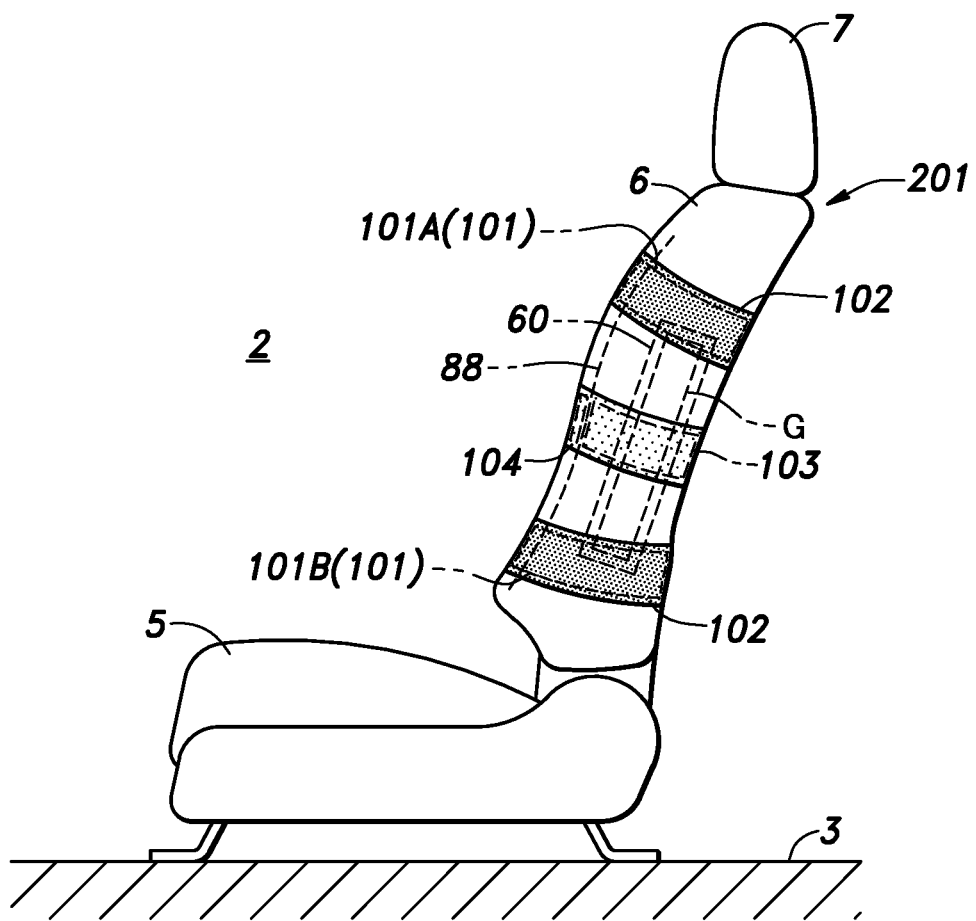
FIG. 6 is a side view of the vehicle seat according to the second embodiment.

As shown in FIG. 6, the upper reinforcement cloth 101A overlaps with the upper portion of the airbag module 60 in side view, and the lower reinforcement cloth 101B overlaps with the lower portion of the airbag module 60 in side view. Note that the upper reinforcement cloth 101A is positioned higher than the position G of the airbag 71 before deployment in side view, and the lower reinforcement cloth 101B is positioned lower than the position G of the airbag 71 before deployment in side view. Next, effects of the vehicle seat 201 thus configured will be described. Since the upper reinforcement cloth 101A and the lower reinforcement cloth 101B are provided to overlap with the airbag module 60 in side view, the first low-elasticity reinforcement parts 102 are formed to overlap with the upper portion and the lower portion of the airbag module 60 in side view. Thereby, compared to the first embodiment, the first low-elasticity reinforcement parts 102 are formed at positions closer to the position G of the airbag 71 before deployment. Therefore, the first low-elasticity reinforcement parts 102 can be provided at positions where they can more reliably suppress upward and downward deployment of the airbag 71 at the time of deployment of the airbag 71, whereby the load applied from the airbag 71 can be more reliably concentrated on the sutured part 88.

Third Embodiment

Compared to the first embodiment, the vehicle seat 301 according to the third embodiment differs in that the webbing 103 is not provided and the left front joint part 95A is provided with a backing cloth, but is the same as the first embodiment with respect to the other configurations, and therefore, description of the other configurations will be omitted.

Figure 7A:
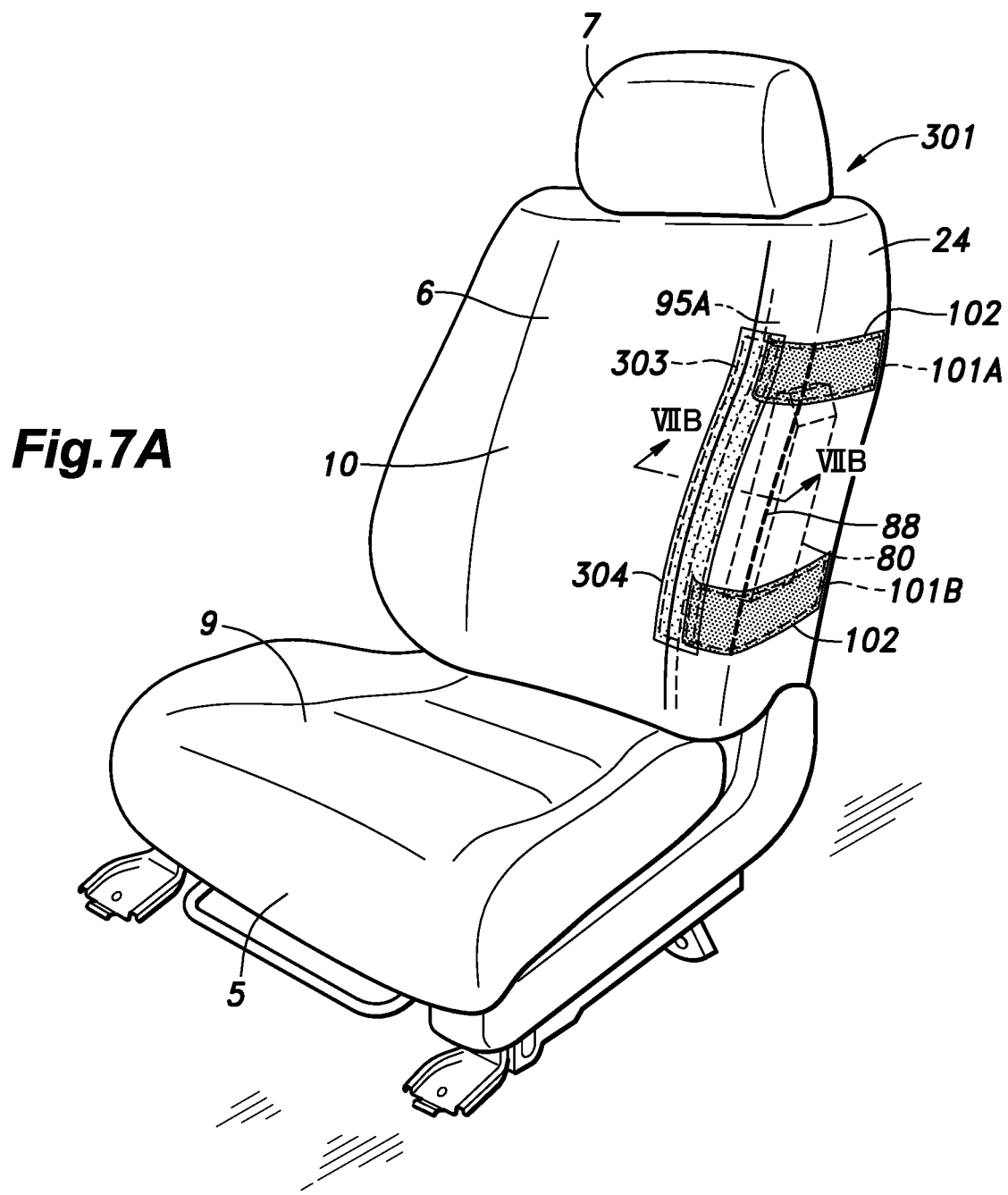
FIG. 7A is a perspective view of the vehicle seat according to the third embodiment.

As shown in FIG. 7(A), the first low-elasticity reinforcement parts 102 are provided to constitute an up and down pair as in the first embodiment. Each of the first low-elasticity reinforcement parts 102 extends forward on the left side surface of the seat back 6 to reach the front surface of the seat back 6 and then extends toward the seat inner side (right side). In the present embodiment, the first low-elasticity reinforcement part 102 on the upper side intersects with the upper end of the sutured part 88 in a T-shape and extends rightward, while the first low-elasticity reinforcement part 102 on the lower side intersects with the lower end of the sutured part 88 in a T-shape and extends rightward. Each of the first low-elasticity reinforcement parts 102 reaches, at the right end portion thereof, the vicinity of the left front joint part 95A which is a seam where the first left cloth member 85AL and the second left cloth member 85AR are joined to each other. In other words, the first low-elasticity reinforcement parts 102 are vertically connected on the side of the front surface of the seat back 6 by the left front joint part 95A.

Figure 7B:
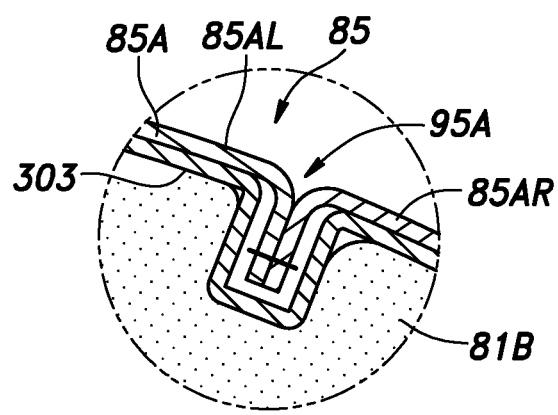
FIG. 7B is a VIIB-VIIB sectional view of FIG. 7A.

As shown in FIG. 7(A), the backing cloth provided on the left front joint part 95A (hereinafter, the left front reinforcement cloth 303) has a strip-shape extending along the left front joint part 95A. As shown in FIG. 7(B), the left front joint part 95A is covered by the left front reinforcement cloth 303 from the inner side. The left front reinforcement cloth 303 is sutured to the skin member 24 on either side of the left front joint part 95A. The left front reinforcement cloth 303 is sutured to the inner surface of the skin member 24 together with the upper reinforcement cloth 101A at the upper end, and is sutured to the inner surface of the skin member 24 together with the lower reinforcement cloth 101B at the lower end. The left front reinforcement cloth 303 vertically connects the upper reinforcement cloth 101A and the lower reinforcement cloth 101B.

Next, effects of the vehicle seat 301 thus configured will be described. The left front reinforcement cloth 303 is provided to cover the left front joint part 95A. Thereby, the load is prevented from being applied to tear the left front joint part 95A at the time of deployment of the airbag 71, and the load applied from the airbag 71 is more likely to be concentrated on the sutured part 88.

As with the first low-elasticity reinforcement parts 102, the part of the skin member 24 provided with the left front reinforcement cloth 303 (hereinafter, the auxiliary low-elasticity reinforcement part 304) is more difficult to stretch than the other parts of the skin member 24 excluding the first low-elasticity reinforcement parts 102. As shown in FIG. 7(A), the seat inner ends (right ends) of the first low-elasticity reinforcement parts 102 are vertically connected to each other by the auxiliary low-elasticity reinforcement part 304. Thereby, the skin member 24 is provided with a part having low stretchability as the first low-elasticity reinforcement parts 102 so as to surround the airbag module 60 from above, below, and front, as viewed obliquely from left front of the vehicle seat 301. Therefore, at the time of deployment of the airbag 71, vertical expansion and forward expansion of the airbag 71 are prevented by the low-elasticity parts thereof, and the load applied from the airbag 71 is concentrated on the sutured part 88. Thereby, the sutured part 88 can be teared promptly and the airbag 71 can be deployed to the side of the occupant promptly.

Fourth Embodiment

Compared to the first embodiment, the vehicle seat 401 according to the fourth embodiment differs in that the webbing 103 is not provided and the structure of the first low-elasticity reinforcement parts 102 is different, but is the same as the first embodiment with respect to the other configurations, and therefore, description of the other configurations will be omitted.

Figure 8:
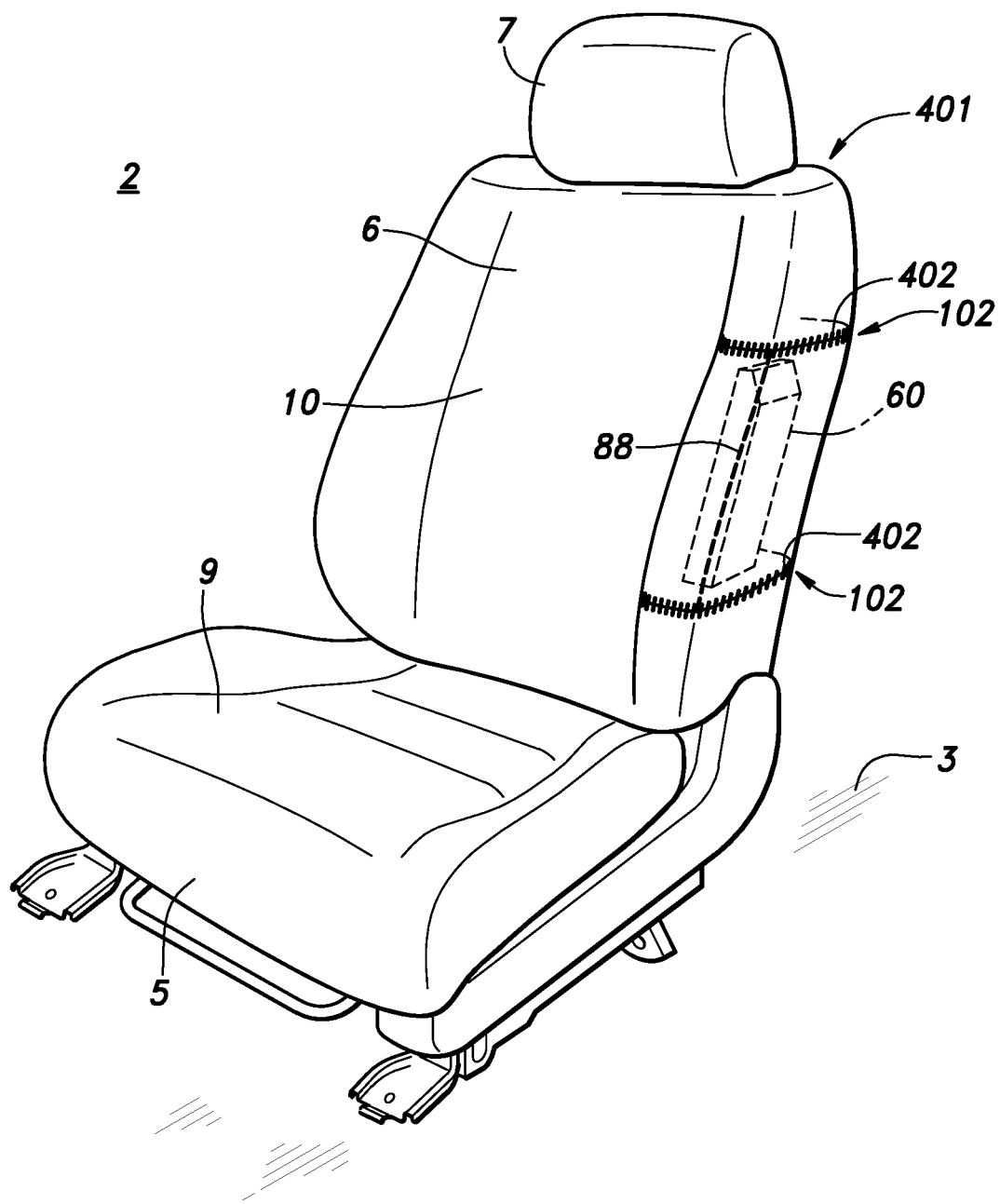
FIG. 8 is a perspective view of the vehicle seat according to the fourth embodiment.

As shown in FIG. 8, the skin member 24 is provided with a pair of upper and lower sewing lines 402 extending in the direction intersecting with the sutured part 88 from the left side surface to the front surface of the pad member 23. The sewing lines 402 are parts which are made to be difficult to stretch by sewing thread of a predetermined count (number) on the skin member 24, and each function as the first low-elasticity reinforcement part 102. In the present embodiment, the sewing lines 402 are configured as parts where thread is decoratively sewn in a linear manner. The larger the count of the thread configuring the sewing lines 402 is, the better, and the count of the thread is greater than at least the count of the thread configuring the sutured part 88.

Next, effects of the vehicle seat 401 thus configured will be described. As in the first embodiment, the part of the skin member 24 provided with the upper sewing line 402 suppresses upward expansion of the airbag 71, and the part of the skin member 24 provided with the lower sewing line 402 suppresses downward expansion of the airbag 71. Thereby, the load applied from the airbag 71 can be concentrated on the sutured part 88 and the airbag 71 can be deployed to the side of the occupant promptly.

In addition, by providing the sewing lines 402, it is possible to easily form the parts with low stretchability in the skin member 24. Accordingly, the configuration of the first low-elasticity reinforcement parts 102 is simple. Also, by designing the shape and arrangement of the sewing lines 402, it is possible to change the shape of the first low-elasticity reinforcement parts 102. Thereby, the load applied from the airbag 71 can be concentrated on the sutured part 88.

Fifth Embodiment

Compared to the first embodiment, the vehicle seat 501 according to the fifth embodiment differs from the first embodiment with respect to the size of the airbag module 60 and the shape of the pad member 23, but is the same as the first embodiment with respect to the other configurations, and therefore, description of the other configurations will be omitted.

Figure 9:
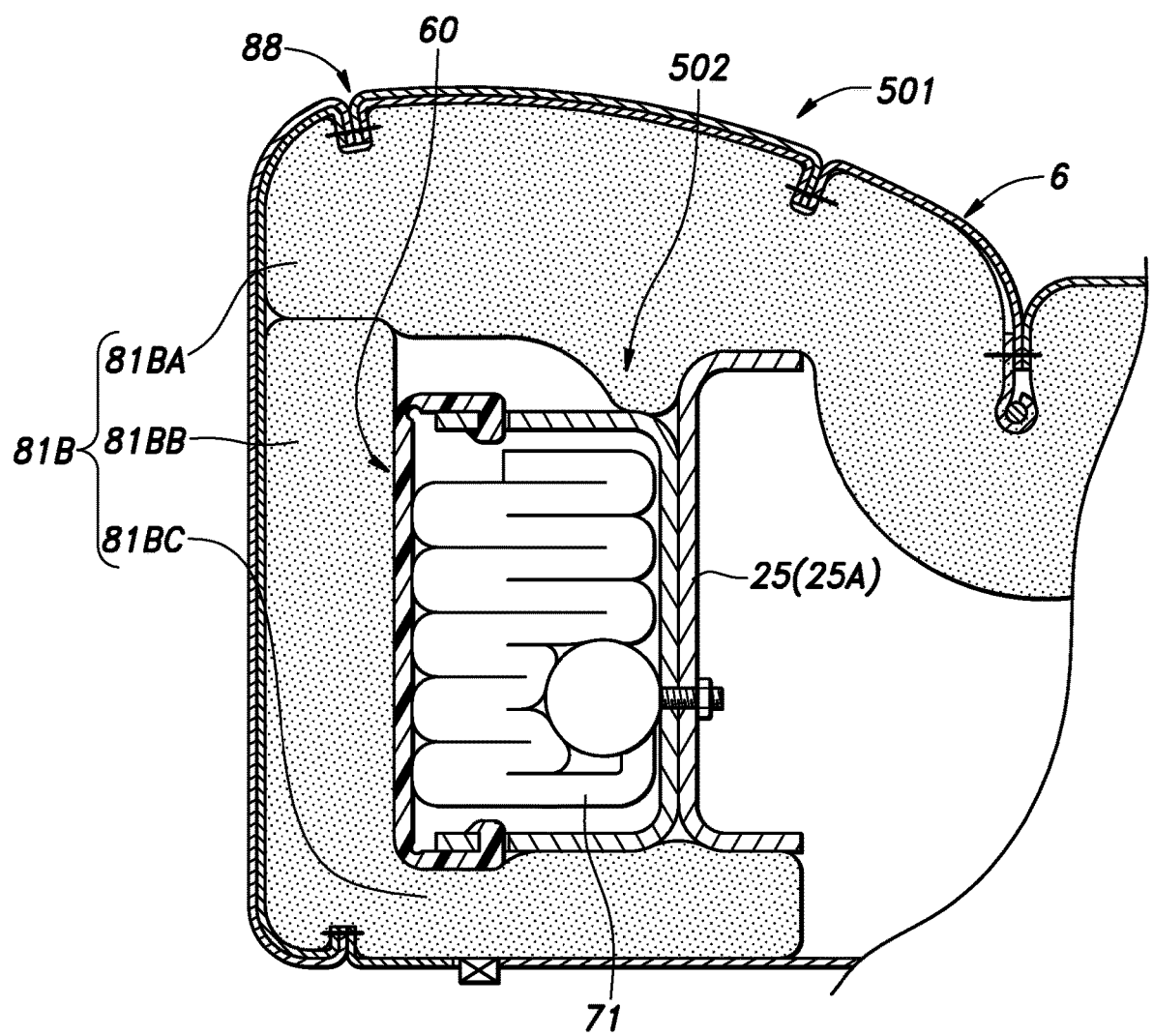
FIG. 9 is a horizontal sectional view of the seat back of the vehicle seat according to the fifth embodiment.

As shown in FIG. 9, as in the first embodiment, the airbag module 60 is joined to the left side surface of the left back side frame 25A of the vehicle seat 501. As in the first embodiment, the airbag module 60 has surfaces facing forward, rearward, leftward, rightward, upward, and downward, and is in a substantially rectangular parallelepiped shape extending vertically along the left back side frame 25A. The size of the airbag module 60 is smaller than that of the airbag module 60 of the first embodiment, and the fore-and-aft width of the airbag module 60 is smaller than the fore-and-aft width of the left back side frame 25A. The rear edge of the airbag module 60 is laterally aligned with the rear edge of the left back side frame 25A, and the front edge of the airbag module 60 is positioned more rearward than the front edge of the left back side frame 25A.

The left side part 81B of the pad member 23 includes a pad left front portion 81BA (pad front portion) connected to the front central part 81A and extending leftward from the front central part 81A, a pad left edge portion 81BB contacting the left end rear surface of the pad left front portion 81BA and extending rearward to cover the airbag module 60 from the left, and a pad left rear portion 81BC continuous to the rear edge of the pad left edge portion 81BB and extending rightward to cover the airbag module 60 from the rear. The pad left front portion 81BA is positioned on the front side of the left back side frame 25A.

The rear surface of the pad left front portion 81BA is in contact with the front surface of the left back side frame 25A. The rear surface of the pad left front portion 81BA is provided with a swelling part 502 that swells rearward to contact the left side surface of the left back side frame 25A. In the present embodiment, the swelling part 502 swells rearward to be in contact with the left side surface of the left back side frame 25A, and has a rear end in contact with the right edge of the front surface of the airbag module 60.

Next, effects of the vehicle seat 501 thus configured will be described. When the case 73 of the airbag module 60 is opened and the airbag 71 expands to outside the case 73, a part of the airbag 71 expands rightward along the front surface of the case 73. At this time, the expansion of the airbag 71 is hindered by the swelling part 502, and intrusion of the airbag 71 between the pad left front portion 81BA and the left back side frame 25A is prevented.

In this way, rightward (toward the seat inner side) expansion of the airbag 71 is prevented, whereby it is possible to effectively expand the airbag 71 obliquely toward left front. As a result, the load applied from the airbag 71 is more likely to be concentrated on the sutured part 88. Therefore, the airbag 71 can be deployed more promptly.

Sixth Embodiment

Compared to the first embodiment, the vehicle seat 601 according to the sixth embodiment differs with respect to the arrangement of the sutured part 88 and the structure of the webbing 602, but is the same as the first embodiment with respect to the other configurations, and therefore, description of the other configurations will be omitted.

Figure 10:
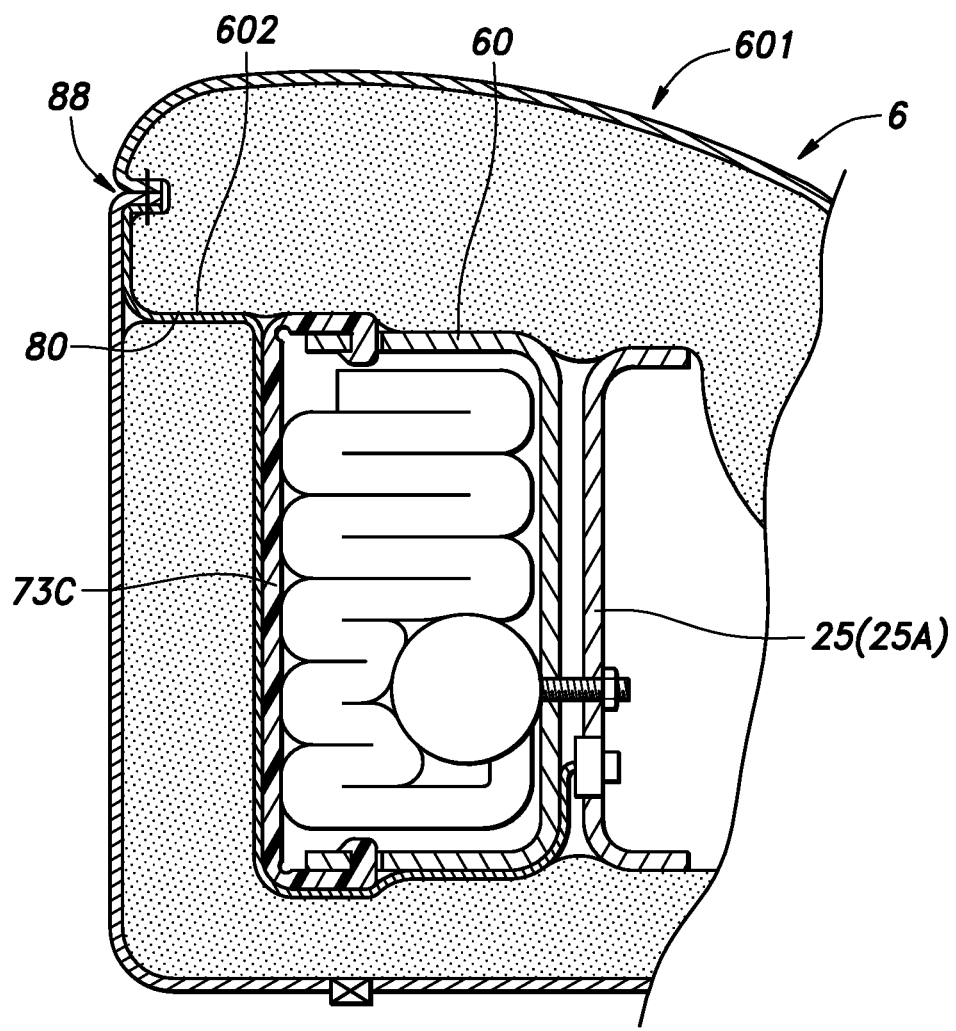
FIG. 10 is a horizontal sectional view of the seat back of the vehicle seat according to the sixth embodiment.

As shown in FIG. 10, the sutured part 88 is provided on the left side surface of the seat back 6. The webbing 602 is constituted of a single strip-shaped cloth member. The webbing 602 is joined to the left back side frame 25A at one end thereof and extends leftward along the rear surface of the airbag module 60. Then, the webbing 602 extends forward along the left side surface (outer surface) of the lid member 73C while being in contact with the left side surface of the lid member 73C to reach the slit 80. The webbing 602 passes through the slit 80 to reach the outer surface of the pad member 23, extends along the outer surface of the pad member 23, and is sutured to the inner surface of the skin member 24 at a position close to the sutured part 88.

Next, effects of the vehicle seat 601 thus configured will be described. as in the first embodiment, when the gas is supplied from the inflator 72 to the airbag 71, the airbag 71 expands and a load is applied to the lid member 73C in the opening direction. Thereby, the frangible part 73E is ruptured and a leftward load is applied to the lid member 73C to rotate the same leftward about the hinge axis. At this time, the leftward load applied to the webbing 602 is transmitted to the sutured part 88, and the sutured part 88 is pulled by the webbing 602 to be teared.

In this way, since the webbing 602 is provided to be in contact with and extend along the outer surface (left side surface) of the lid member 73C, the expansion pressure of the airbag 71 can be promptly transmitted to the sutured part 88. Thereby, the sutured part 88 can be teared more promptly and the airbag 71 can be deployed more promptly.

Seventh Embodiment

Compared to the first embodiment, the vehicle seat 701 according to the seventh embodiment differs with respect to the arrangement of the webbing 702, but is the same as the first embodiment with respect to the other configurations, and therefore, description of the other configurations will be omitted.

Figure 11:
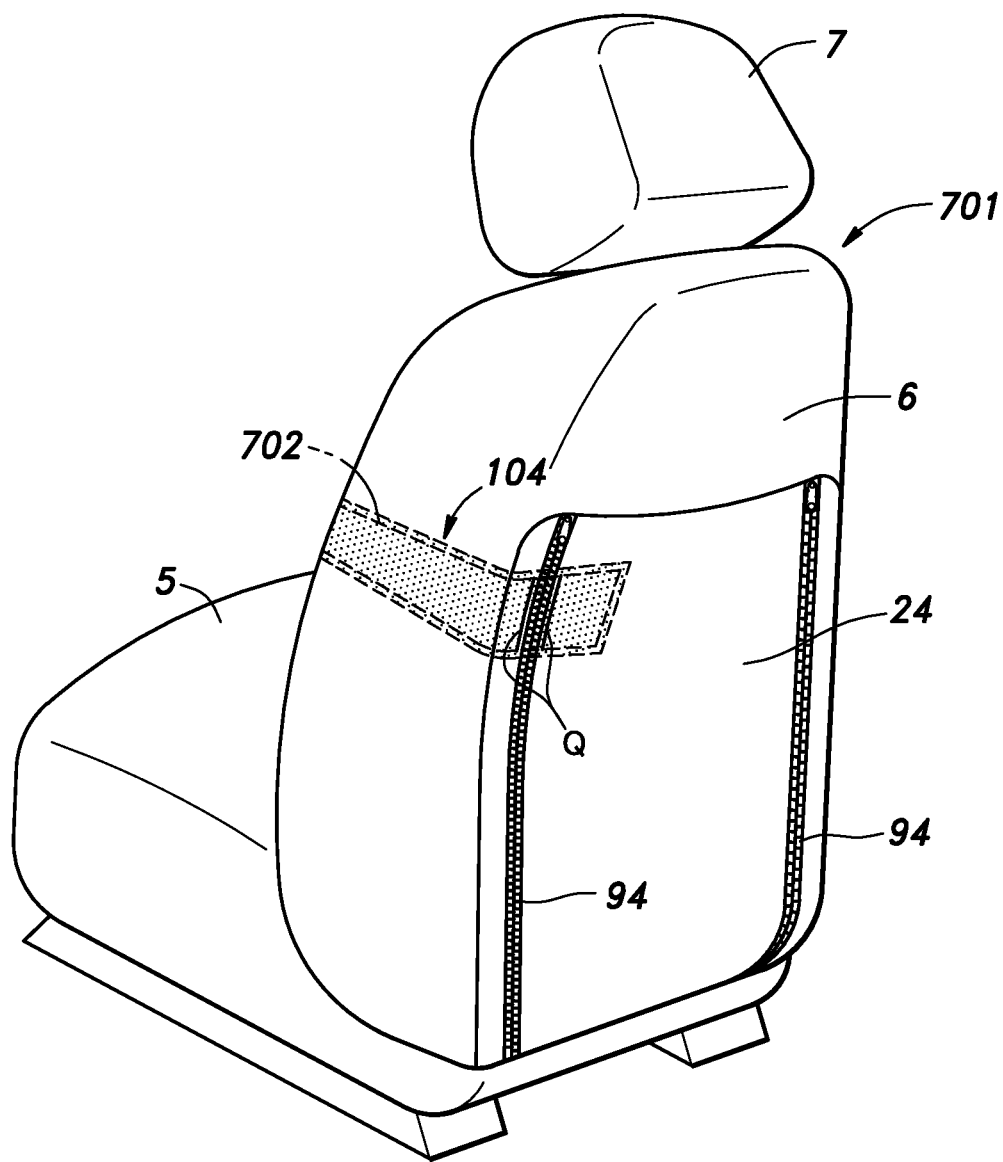
FIG. 11 is a perspective view of the vehicle seat according to the seventh embodiment.

As shown in FIG. 11, in the vehicle seat 701 according to the seventh embodiment, as in the first embodiment, the webbing 702 constituting the second low-elasticity reinforcement part 104 is provided on the skin member 24. The webbing 702 is sutured to the sutured part 88 at one end thereof and extends rearward along the left side surface of the pad member 23 to reach the left rear end portion of the pad member 23. The webbing 702 further extends toward the seat inner side (rightward) along the rear surface of the pad member 23, passes on the inner side of a line fastener 94 provided in the vicinity of the left edge of the rear skin member 87, and is sutured to the inner surface of the rear skin member 87 on the right side of the line fastener 94. At this time, the webbing 702 is disposed to straddle the line fastener 94 and is joined to the skin member 24 at positions Q spaced from the line fastener 94 on either lateral side of the line fastener 94.

The effect of the vehicle seat 701 thus configured will be described. The webbing 702 is provided to straddle the line fastener 94 and is sutured at a position spaced from the line fastener 94. This makes it difficult for the load from the webbing 702 to be transmitted to the line fastener 94, and therefore, arrangement of the webbing 702 that does not depend on the rupture strength of the line fastener 94 is possible.

Eighth Embodiment

Compared to the first embodiment, the vehicle seat 801 according to the eighth embodiment differs in that the arrangement of the webbing 802 is different and the rear skin member 87 is provided with a pocket 803. The other configurations are the same as in the first embodiment, and therefore, description of the other configurations will be omitted.

Figure 12:
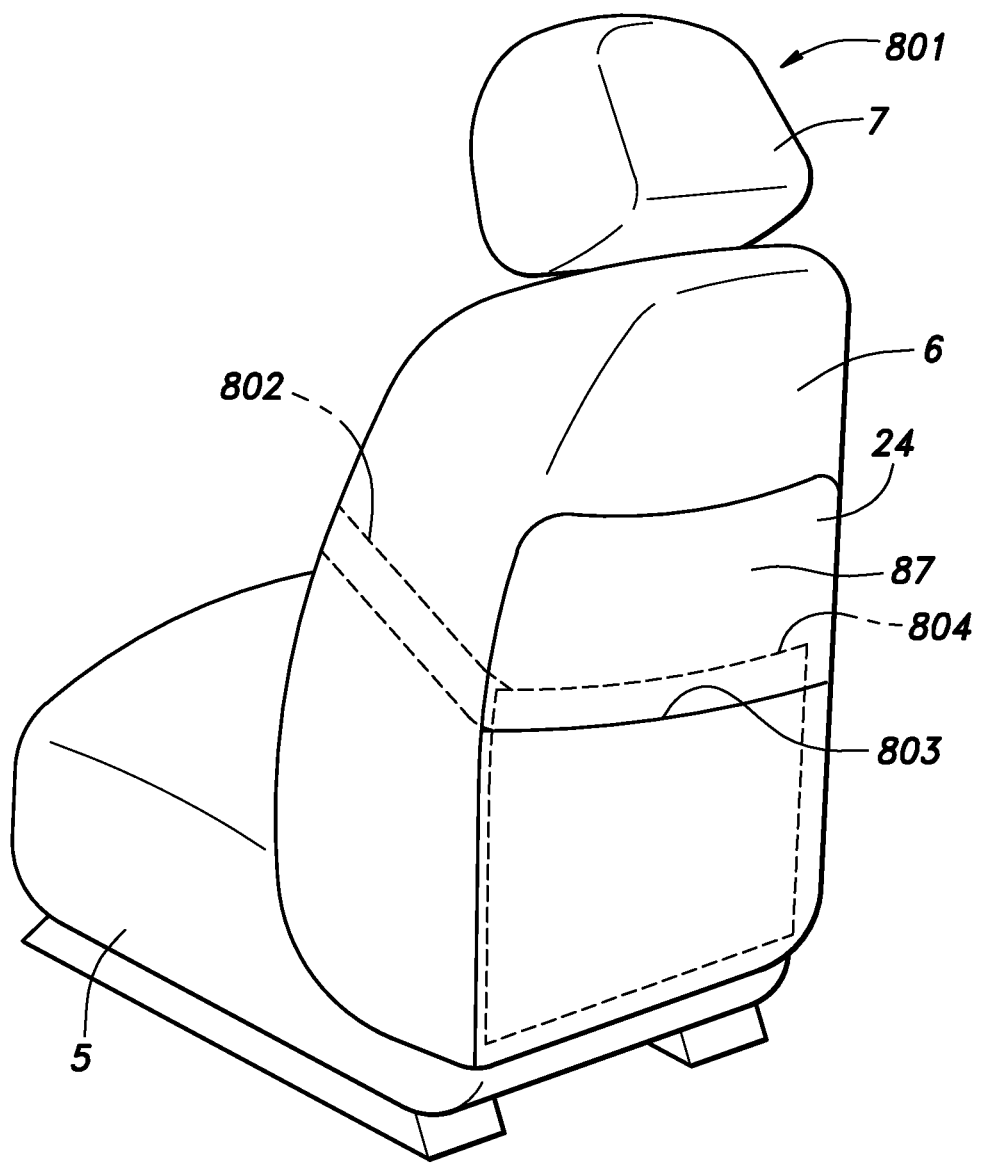
FIG. 12 is a perspective view of the vehicle seat according to the eighth embodiment.

As shown in FIG. 12, a plate 804 is sutured to a substantially central part of the inner surface of the rear skin member 87, and the pocket 803 is sutured at a position overlapping with a surface of the plate 804. As in the first embodiment, the webbing 802 is sutured to the sutured part 88 at one end thereof and extends rearward along the left side surface of the pad member 23 to reach the left rear end portion of the seat back 6. The webbing 802 further extends toward the seat inner side (rightward) along the rear surface of the pad member 23 and is sutured to the vicinity of the plate 804 provided on the rear skin member 87.

The effect of the vehicle seat 801 thus configured will be described. The joining part between the skin member 24 and the webbing 802 is reinforced by the plate 804. Thereby, the strength of the joint between the webbing 802 and the skin member 24 is improved, and the webbing 802 and the skin member 24 do not separate easily at the time of deployment of the airbag 71. Therefore, the load from the webbing 802 can be transmitted to the sutured part 88 more reliably and the sutured part 88 can be teared more promptly.

Ninth Embodiment

Figure 13:
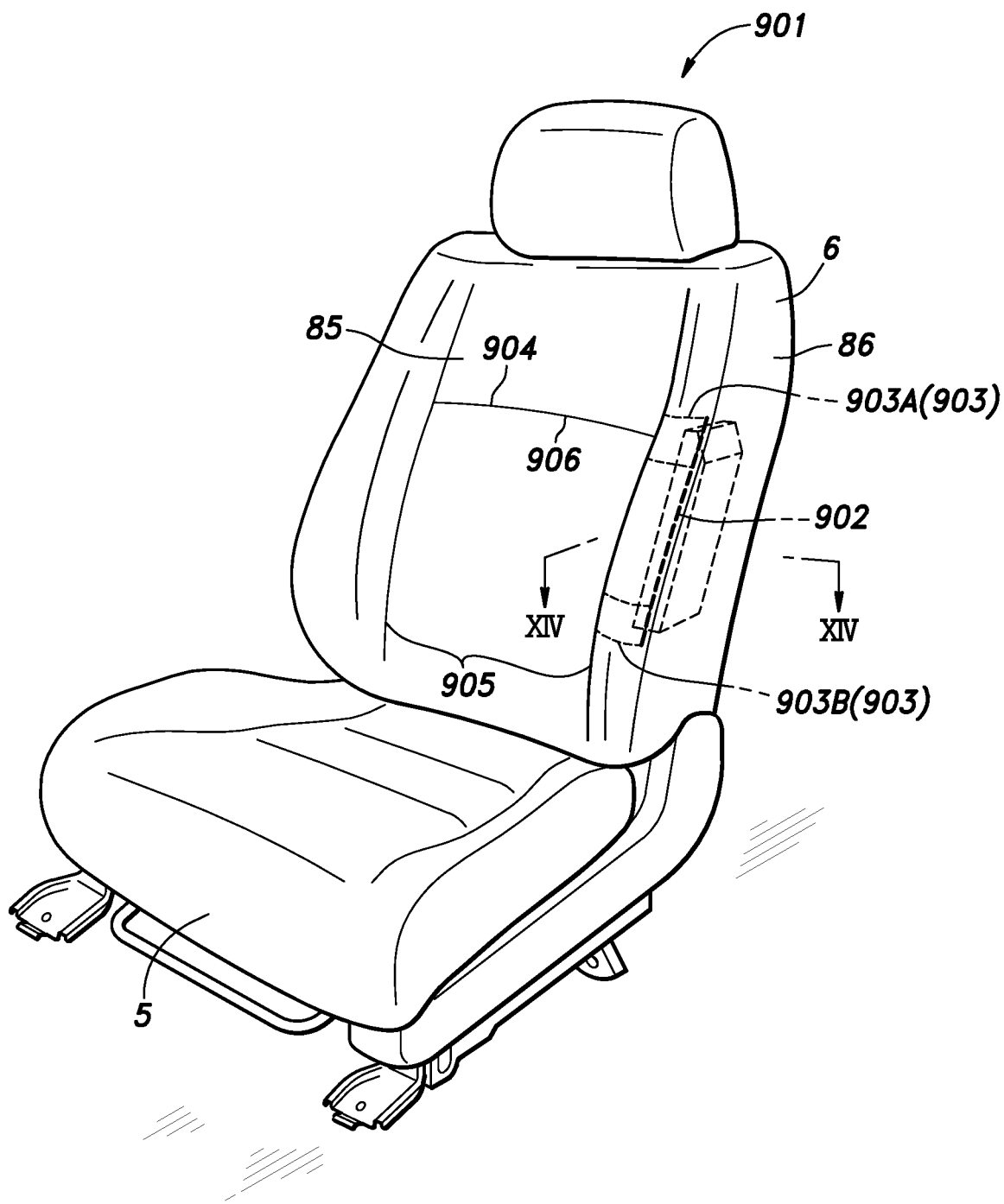
FIG. 13 is a perspective view of the vehicle seat according to the ninth embodiment.

In the vehicle seat 901 according to the ninth embodiment shown in FIG. 13, compared to the first embodiment, the upper reinforcement cloth 101A and the lower reinforcement cloth 101B are not provided, and further, the position of the sutured part 902, the structure of the webbings 903, and the structure for securing (tucking) the skin member (front skin member 85) and the webbings 903 to the pad member 23 of the seat back 6 are different. The other configurations are substantially the same as in the first embodiment, and therefore, description of the other configurations will be omitted below.

As can be understood by comparing FIG. 1 with FIG. 13, the sutured part 902 is positioned slightly more inward than the left edge of the front surface of the seat back 6.

Figure 14A:
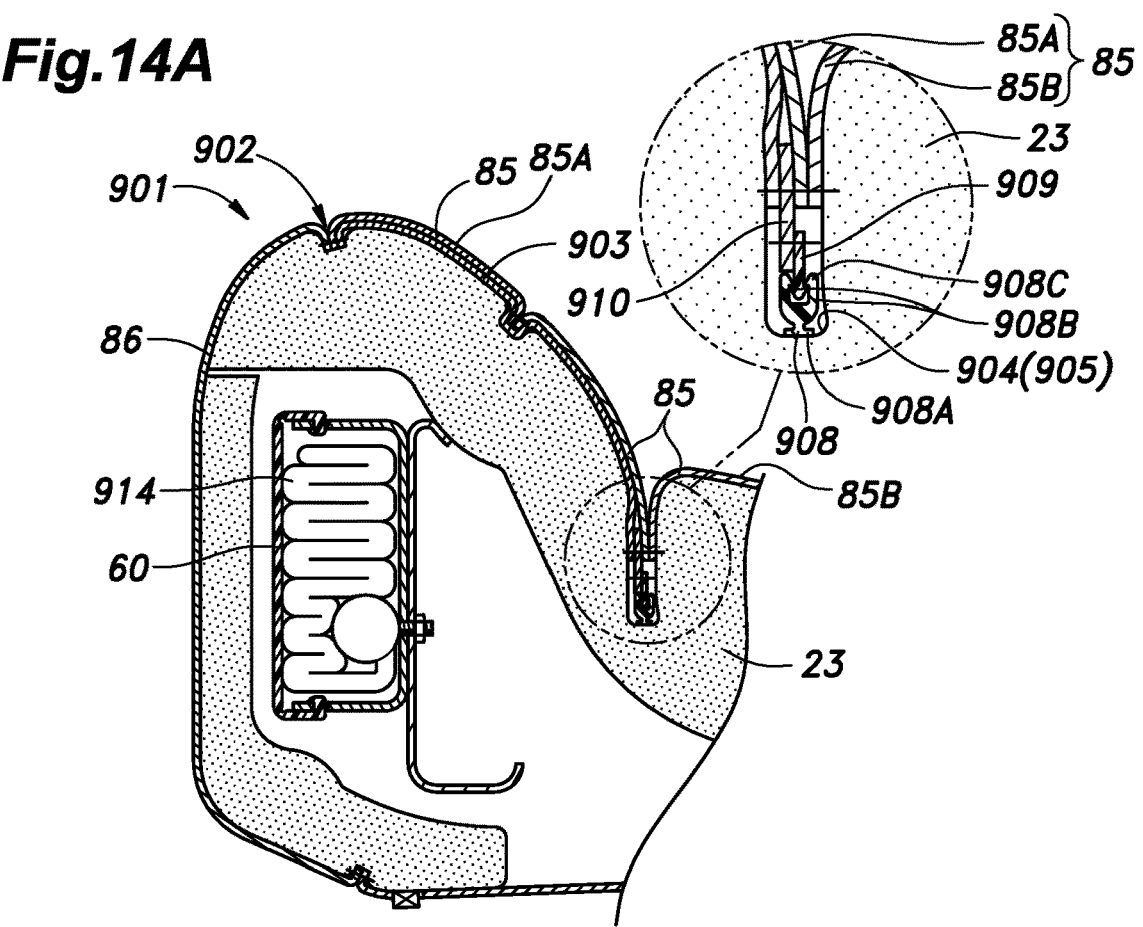
FIG. 14A is a XIV-XIV sectional view of FIG. 13 showing the airbag before deployment

The front surface of the seat back 6 of the pad member 23 is provided with a tucking groove 904 that is recessed rearward. The tucking groove 904 is in an H shape in front view. The tucking groove 904 includes a pair of left and right vertical groove parts 905 extending in the vertical direction and a lateral groove part 906 laterally connecting the substantially central parts of the left and right vertical groove parts 905 with respect to the vertical direction to each other. As shown in FIG. 14(A), clips 908 made of resin are provided in appropriate positions of the tucking groove 904.

The clips 908 are buried in the bottom portion of the tucking groove 904 and are joined to the pad member 23. Each clip 908 has a plate-shaped base portion 908A secured to the bottom portion of the tucking groove 904 and a pair of protruding pieces 908B protruding from the base portion 908A toward the opening of the tucking groove 904. The protruding pieces 908B are respectively provided with locking claws 908C protruding toward each other.

The front surface of the pad member 23 is provided with a pair of upper and lower webbings 903. One end portion (the right end portion in front view) of each webbing 903 is sutured to the front skin member 85 and the left skin member 86 at the sutured part 902. The other end portion (the left end portion in front view) of each webbing 903 is joined to locking tools 909 together with the front skin member 85. In the present embodiment, as shown in the enlarged view surrounded by a two-dot chain line in FIG. 14(A), the front skin member 85 is formed by suturing two cloth members 85A, 85B, and the sutured part of the two cloth members 85A, 85B and the webbing 903 are sutured to a single cloth member 910, and the cloth member 910 is sutured to the locking tools 909.

Each locking tool 909 has an arrowhead shape in cross section and is secured to the corresponding clip 908 by being engaged with the locking claws 908C. Thereby, the other end of each webbing 903 and the front skin member 85 are joined to the pad member 23 in a state being tucked toward the bottom portion of the tucking groove 904.

As shown in FIG. 13, one of the webbings 903 is in a position overlapping with the upper edge of the airbag module 60 in side view, and the other of the webbings 903 is in a position overlapping with the lower edge of the airbag module 60 in side view.

Figure 15:
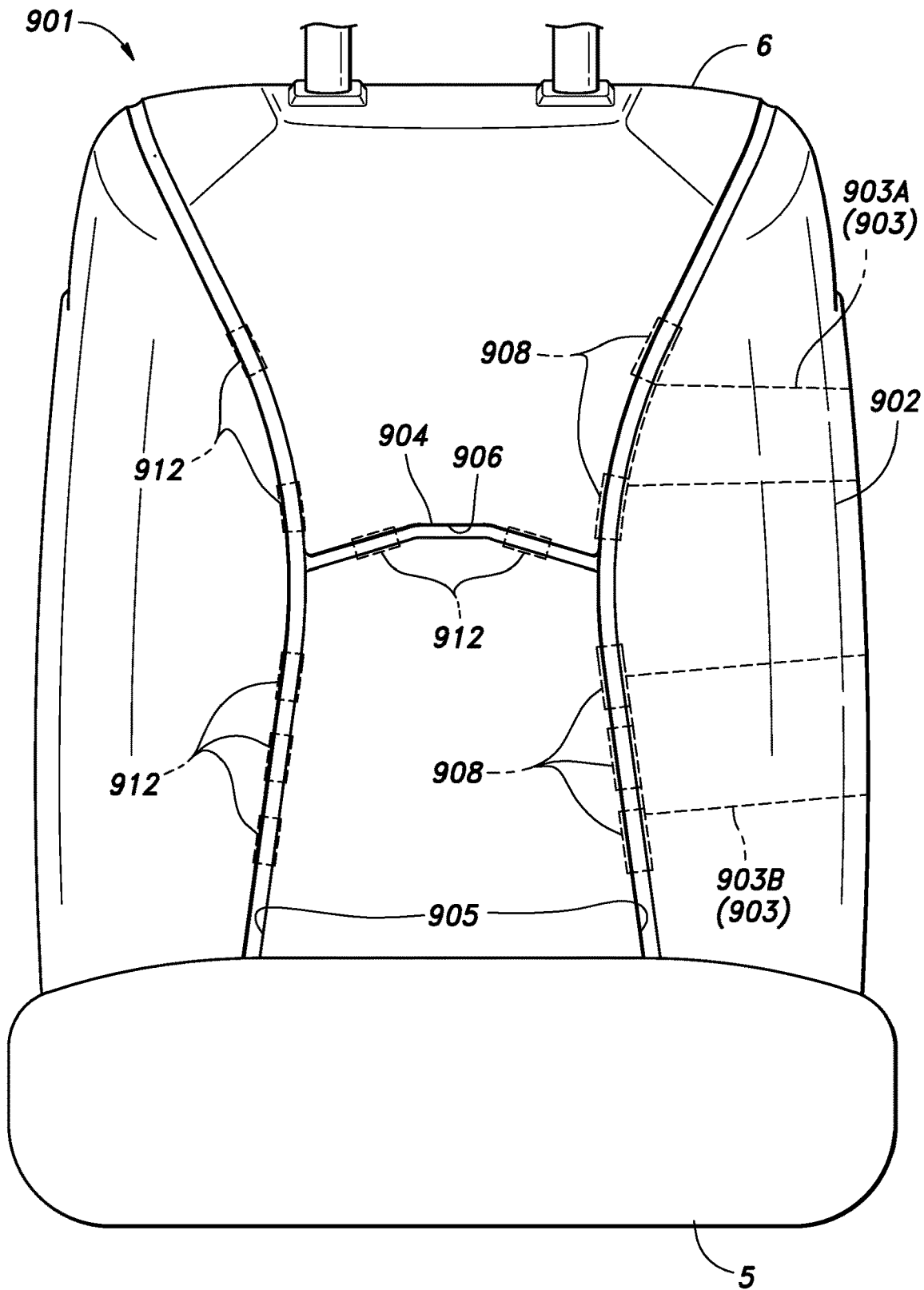
FIG. 15 is a front view of the vehicle seat according to the ninth embodiment.

As shown in FIG. 15, the upper webbing 903A is positioned above the lateral groove part 906, and the lower webbing 903B is positioned below the lateral groove part 906. The upper webbing 903A is disposed at the height of the chest of a standard seated person, and the lower webbing 903B is disposed at the height of the hip of a standard seated person.

The upper webbing 903A is tucked into the tucking groove 904 via two clips 908. On the other hand, the lower webbing 903B is tucked into the tucking groove 904 via three clips 908. The upper webbing 903A has a smaller area than the lower webbing 903B.

At positions where the webbings 903 are not provided also, the seat back 6 is likewise provided with clips made of resin (hereinafter, clips 912). These clips 912 are for tucking only the front skin member 85 and similarly to the clips 908 for tucking the webbings 903 and the front skin member 85, are buried in the tucking groove 904. The clips 912 for tucking only the front skin member 85 are smaller in size than the clips 908 for tucking the front skin member 85 and the webbings 903. However, the present invention is not limited to this embodiment and, for example, the protruding pieces (not shown in the drawings) of these clips 912 may be smaller in thickness than the protruding pieces 908B of the clips 908 for supporting the webbings 903.

Figure 14B:
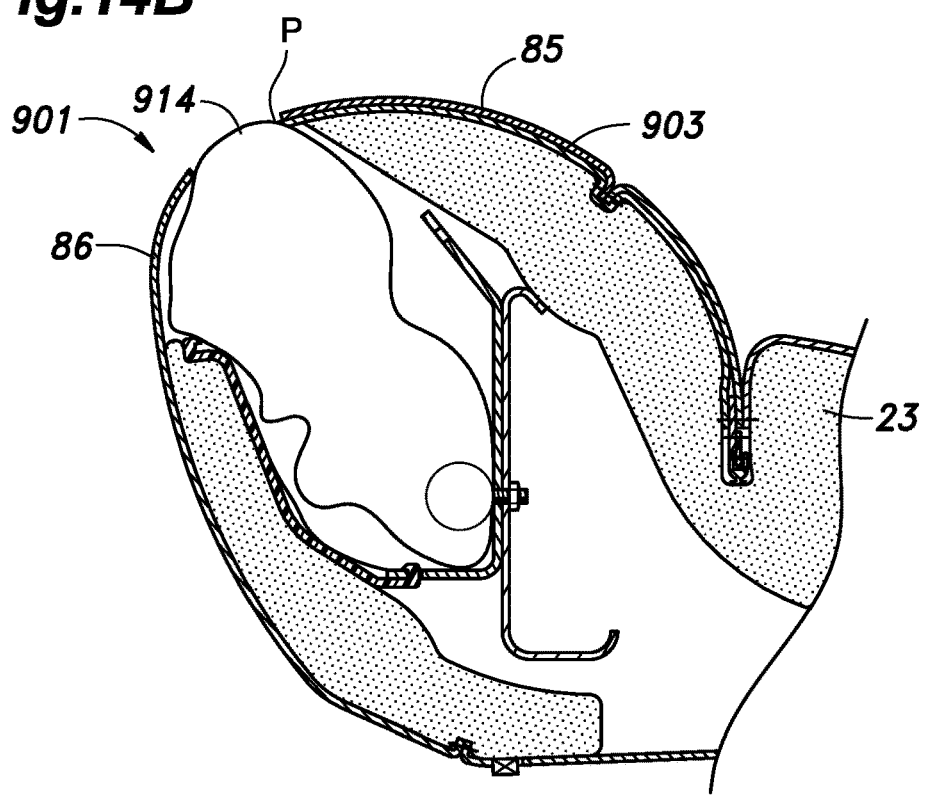
FIG. 14B is a XIV-XIV sectional view of FIG. 13 showing the airbag during deployment.

Effects of the vehicle seat 901 thus configured will now be described. The sutured part 902 is disposed slightly more inward than the left edge of the front surface of the seat back 6 and, as compared to the first embodiment (FIG. 1), on the side of the front surface of the seat back 6. Thereby, as shown in FIG. 14(B), the sutured part 902 corresponds to the front end portion (vertex P) of the airbag 914 at the time of deployment, and the vertex P of the airbag 914 at the time of deployment is aligned with the end portions (left end portions) of the webbings 903.

Thereby, the load applied to the part where the skin member (front skin member 85) and the webbings 903 are tucked (more specifically, the joining part between the clips 908 and the wall surfaces defining the tucking groove 904 of the pad member 23) via the webbings 903 at the time of deployment of the airbag 914 can be reduced.

The lower webbing 903B has a larger area than the upper webbing 903A and is tucked into the tucking groove 904 via a larger number of clips 908. Thereby, at the time of deployment of the airbag 914, the load is dispersed more in the webbing 903B corresponding to the hip than in the webbing 903A corresponding to the chest so that the load can be supported by the clips 908 more reliably. As a result, the airbag 914 can be deployed more promptly at the hip position to that the hip can be protected promptly.

Since the size of the clips 912 for tucking only the front skin member 85 is smaller (or the thickness of the protruding pieces is smaller) than the clips 908 for tucking the front skin member 85 and the webbings 903, each clip 908, 912 can have an appropriate size taking into account the member(s) to be tucked compared to the case where the clips 908, 912 all have the same size.

Tenth Embodiment

Figure 16:
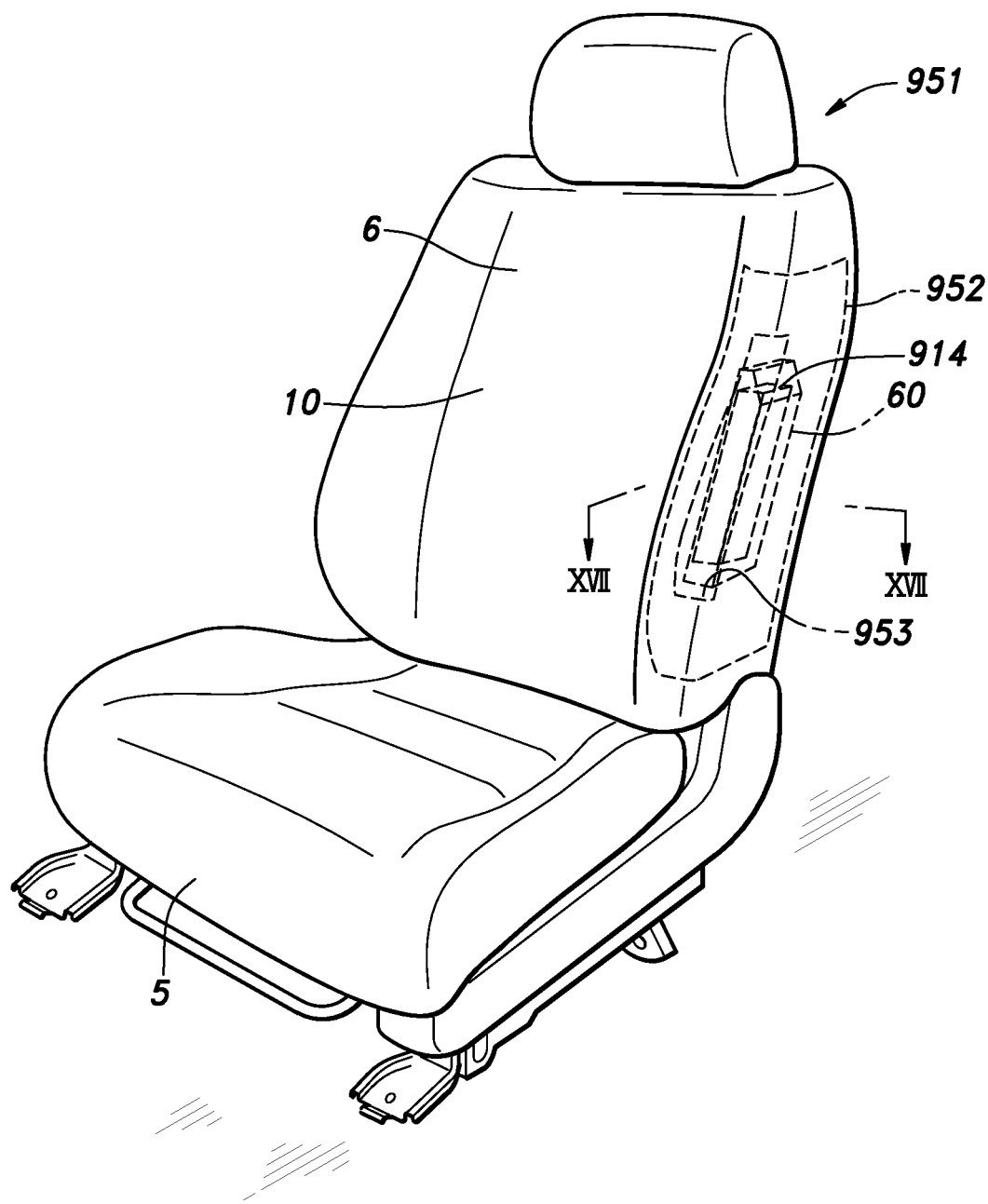
FIG. 16 is a perspective view of the vehicle seat according to the tenth embodiment.

As shown in FIG. 16, the vehicle seat 951 according to the tenth embodiment differs from the ninth embodiment in that a backing cloth 952 is provided between the airbag module 60 and the pad member 23 of the seat back 6, but is the same as the ninth embodiment with respect to the other configuration, and therefore, description of the other configurations will be omitted.

Figure 17:
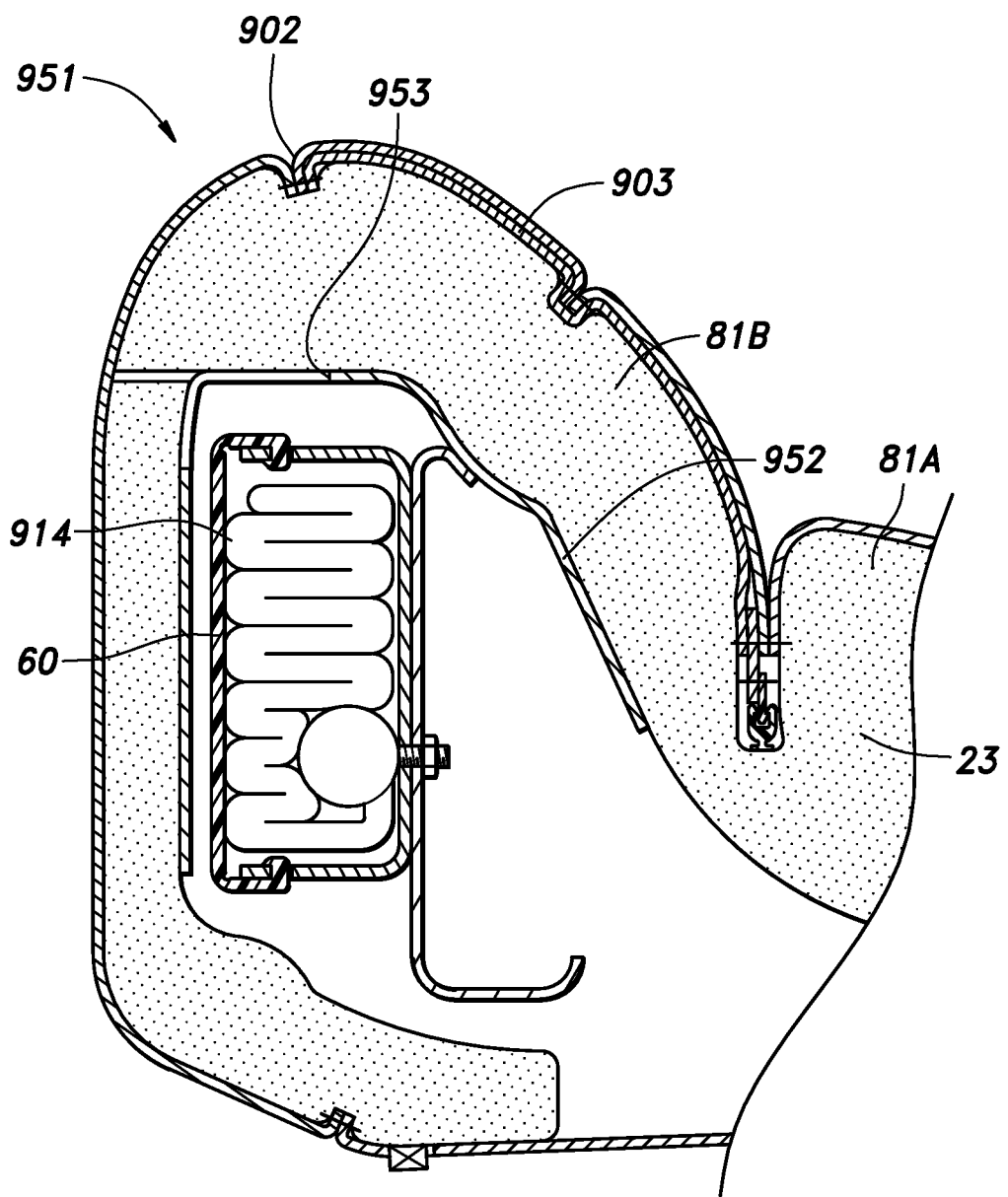
FIG. 17 is a XVII-XVII sectional view of FIG. 16.

As shown in FIG. 17, as in the first embodiment, the pad member 23 includes a front central part 81A provided on the front side of the seat back frame 22 at a position corresponding to the backrest surface 10, a left side part 81B positioned on the left of the front central part 81A and swelling forward, and a right side part (not shown in the drawings) positioned on the right of the front central part 81A and swelling forward. The airbag module 60 is covered by the left side part 81B from the front side, rear side, upper side, lower side, and vehicle outer side (left side).

The backing cloth 952 is a sheet-shaped member made of cloth provided on the inner side of the left side part 81B of the pad member 23 and has a rectangular strip-shape extending vertically. The backing cloth 952 is disposed at a position overlapping with the airbag module 60 from left front.

As shown in FIG. 16, the backing cloth 952 is provided with an opening 953. The opening 953 is a hole penetrating the backing cloth 952. The upper edge and the lower edge of the opening 953 are positioned vertically more outside than the upper edge and the lower edge of the airbag module 60, and the opening 953 overlaps with the airbag module 60 (or the airbag 914 before deployment) in the vertical direction. In the present embodiment, the airbag module 60 at least partially overlaps with the opening 953 as viewed in the horizontal direction (more specifically, as viewed from the left front).

Next, effects of the vehicle seat 951 thus configured will be described. Since the backing cloth 952 is provided, the stiffness of the part of the pad member 23 provided with the backing cloth 952 can be enhanced. Also, since the opening 953 is provided in the part of the backing cloth 952 overlapping with the airbag module 60, deformation of the part of the pad member 23 provided with the backing cloth 952 can be prevented at the time of deployment of the airbag 914 and the deployment direction of the airbag 914 can be guided toward the opening 953.

Concrete embodiments of the present invention have been described in the foregoing, but the present invention is not limited to the above embodiments and may be modified or altered in various ways. In the above-described first embodiment, the upper reinforcement cloth 101A and the lower reinforcement cloth 101B were provided above and below the airbag module 60 in side view, respectively, but the present invention is not limited to this embodiment. For example, the upper reinforcement cloth 101A may be positioned above the airbag module 60 in side view while the lower reinforcement cloth 101B may overlap with the lower portion of the airbag module 60 in side view. Also, the upper reinforcement cloth 101A may overlap with the upper portion of the airbag module 60 in side view while the lower reinforcement cloth 101B may be positioned below the airbag module 60 in side view.

It is also possible that the skin member 24 is not provided with the webbing 103 and is provided with only one of the upper reinforcement cloth 101A and the lower reinforcement cloth 101B. Thereby, the skin member 24 is formed with a first low-elasticity reinforcement part 102 so as to extend from the vicinity of the sutured part 88 in the direction intersecting with the sutured part 88. As a result of formation of the first low-elasticity reinforcement parts 102, the deployment direction of the airbag 71 is guided toward the sutured part 88, whereby the load from the airbag 71 is more likely to be concentrated on the sutured part 88.

Figure 18:
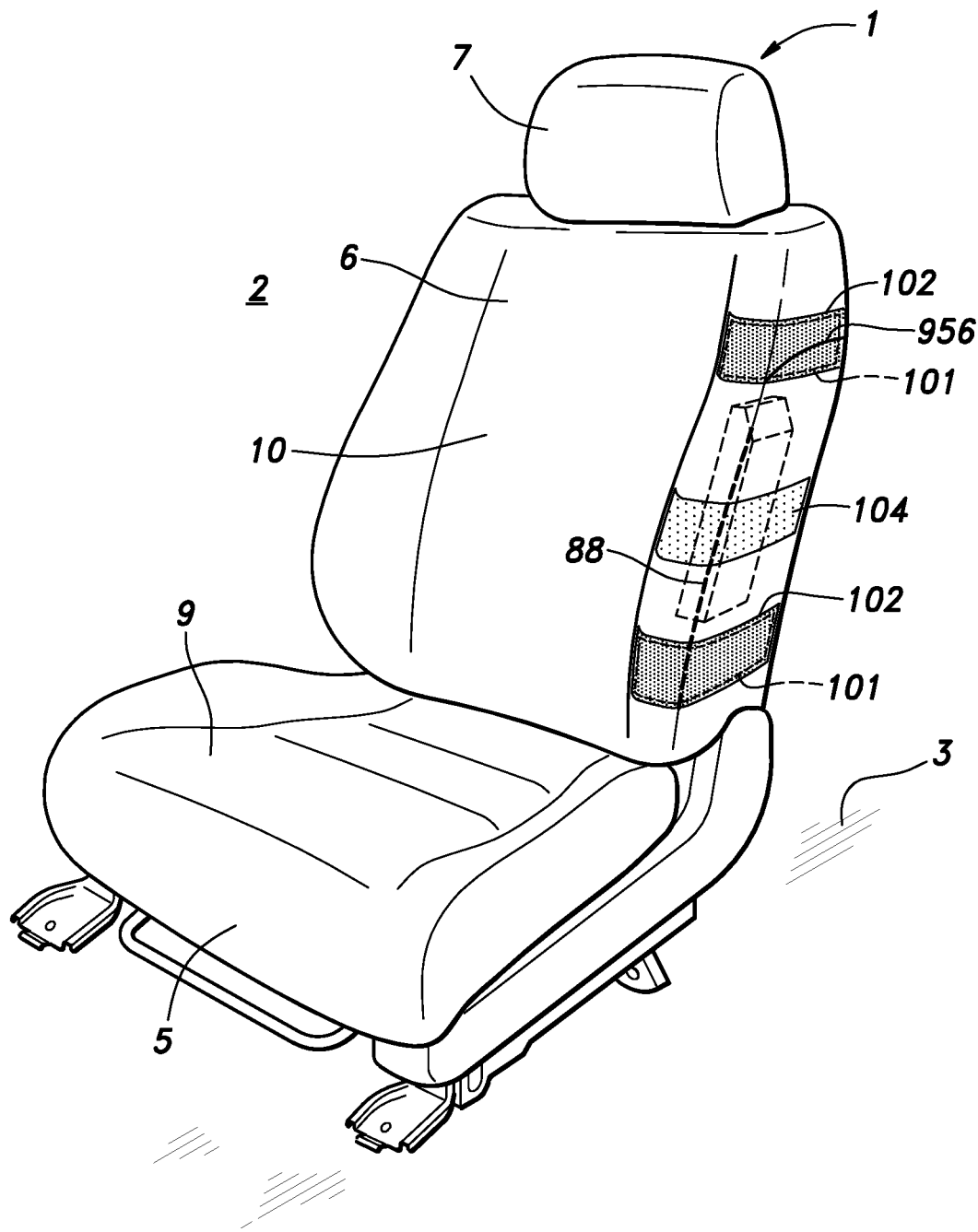
FIG. 18 is a first modification of the vehicle seat according to the first embodiment.

In the above embodiment, the left front joint part 95A, the right front joint part, the left rear joint part 92, and the right rear joint part were each provided to extend vertically, but the present invention is not limited to this embodiment. As shown in FIG. 18 (first modification of the first embodiment), in a case where a joint part 956 is provided in the left skin member 86 to extend in the fore and aft direction to make the seat back 6 in a predetermined shape, it is preferred that the joint part 956 is covered by the reinforcement cloths 101 from the inner side. Thereby, it is possible to prevent the joint part 956 from being teared at the time of deployment of the airbag 71, and the load applied from the airbag 71 can be concentrated on the sutured part 88.

Figure 19:
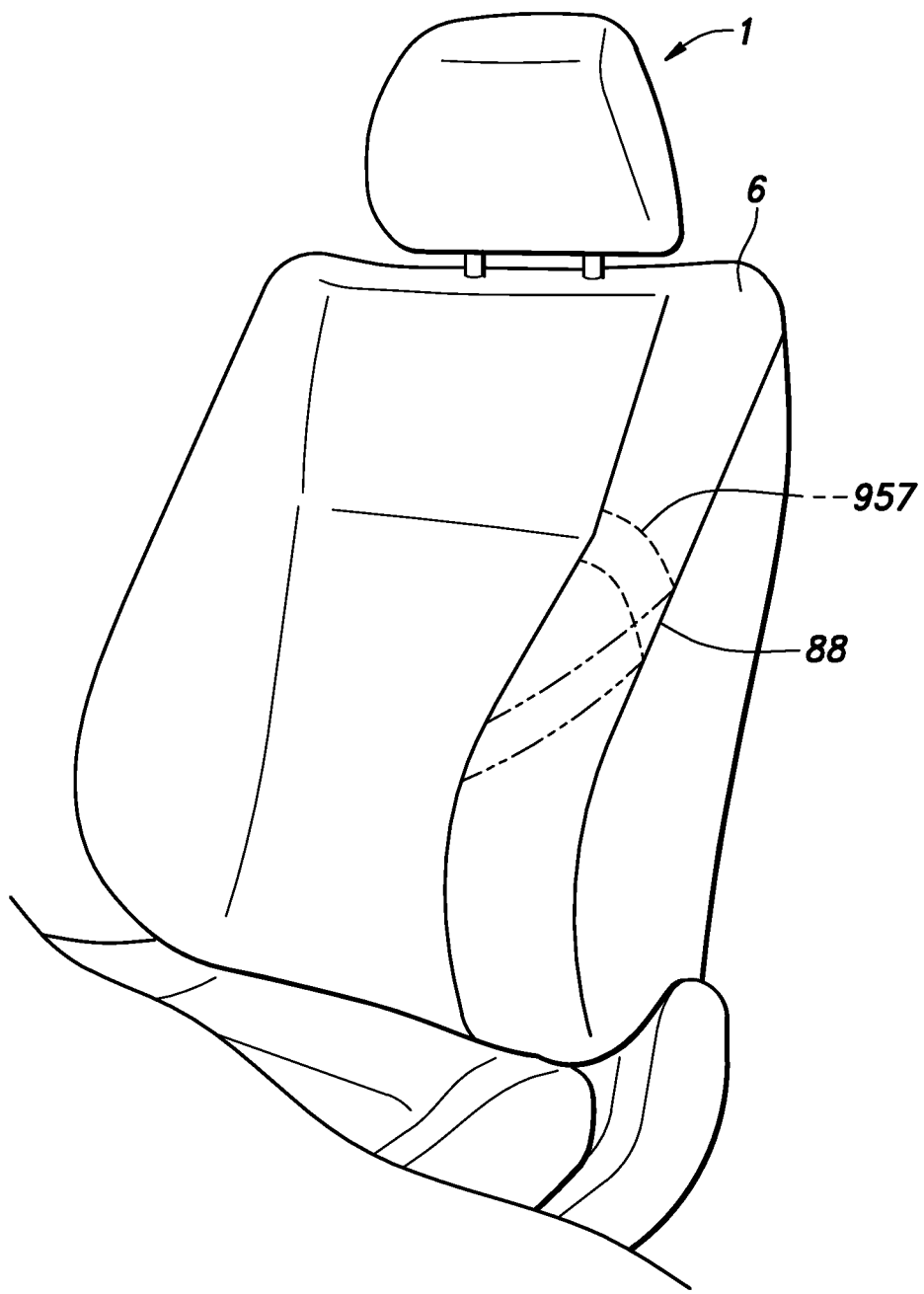
FIG. 19 is a second modification of the vehicle seat according to the first embodiment.

As shown in FIG. 19 (second modification of the first embodiment), it is preferred to dispose the sutured part 88 and the webbing 957 to be as orthogonal as possible. Thereby, compared to a case where the webbing 957 and the sutured part 88 are near substantially parallel (see the two-dot chain line in FIG. 14), the load is more easily transmitted from the webbing 957 to the sutured part 88.

Figure 20:
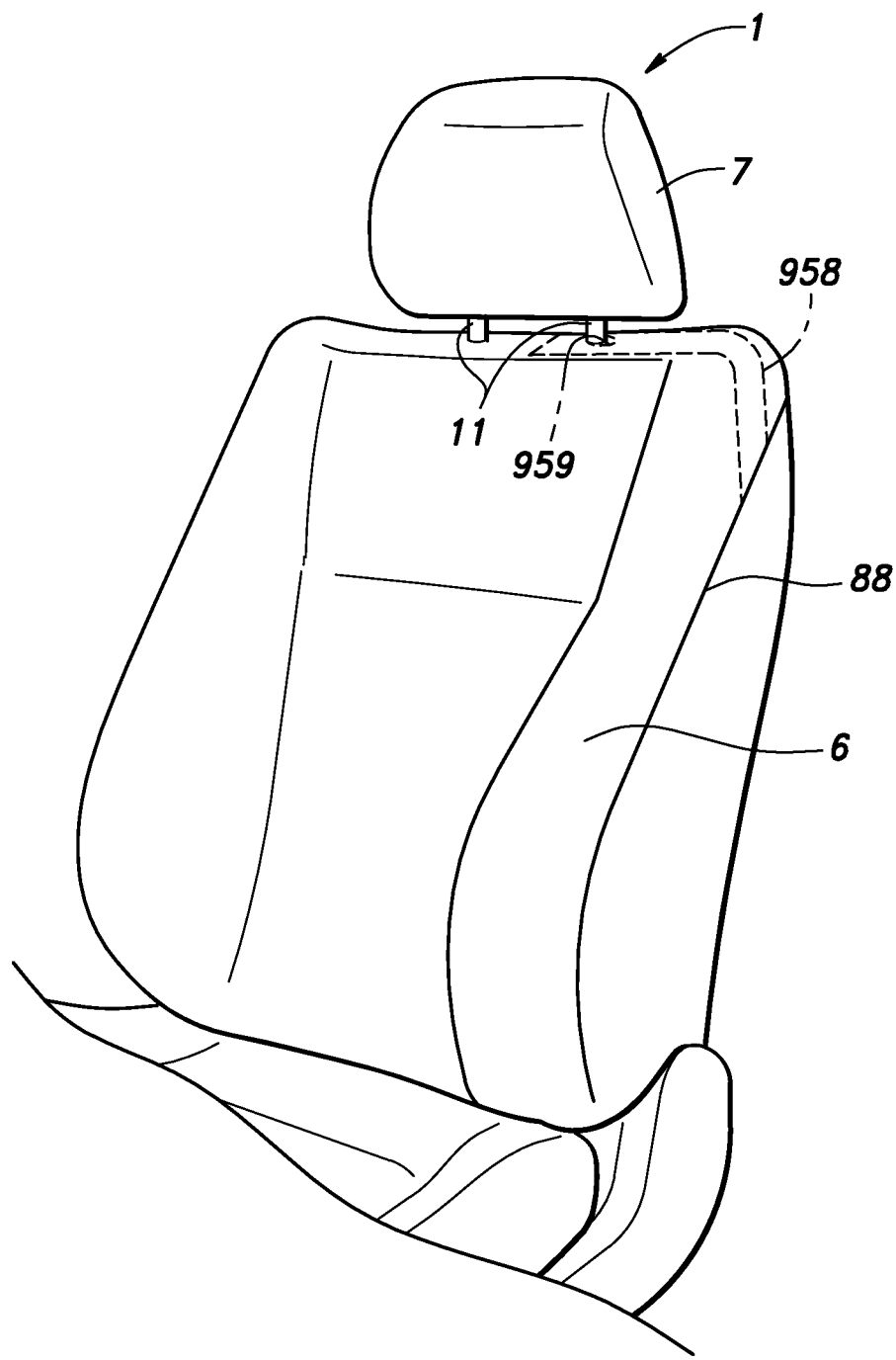
FIG. 20 is a third modification of the vehicle seat according to the first embodiment.

As shown in FIG. 20 (third modification of the first embodiment), configuration may be made such that one end of the webbing 958 is secured to a pillar 11 of the headrest 7. In this embodiment, a circular through hole 959 is provided in the one end of the webbing 958 and the pillar 11 is passed through the through hole 959, whereby the one end of the webbing 958 is secured. With such a configuration, the one end of the webbing 958 can be easily fixed to the seat back frame 22.

In the third embodiment described above, the auxiliary low-elasticity reinforcement part 304 was formed by the left front reinforcement cloth 303, but the present invention is not limited to this embodiment. It is only required that each of the first low-elasticity reinforcement parts 102 extends forward on the left side surface of the seat back 6 (the vehicle-outer-side side surface) to reach the front surface of the seat back 6, each of the first low-elasticity reinforcement parts 102 intersects with the sutured part 88, and the auxiliary low-elasticity reinforcement part 304 having lower stretchability than the other part excluding the first low-elasticity reinforcement parts 102 connects the parts of the first low-elasticity reinforcement parts 102 closer to the extension ends than the sutured part 88 to each other. The auxiliary low-elasticity reinforcement part 304 may be configured by sewing thread on the skin member 24 similarly to the sewing line 402 of the fourth embodiment.

In the above embodiment, the vehicle seat 1 was placed on the floor 3 such that the left side thereof coincides with the vehicle outer side, but the present invention is not limited to this embodiment. For example, the vehicle seat 1 may be placed on the floor 3 such that the right side thereof coincides with the vehicle outer side. In this case, the airbag module 60, the first low-elasticity reinforcement parts 102, and the second low-elasticity reinforcement part 104 each should be provided on the right side of the vehicle seat 1 which is the vehicle outer side.

Figure 21:
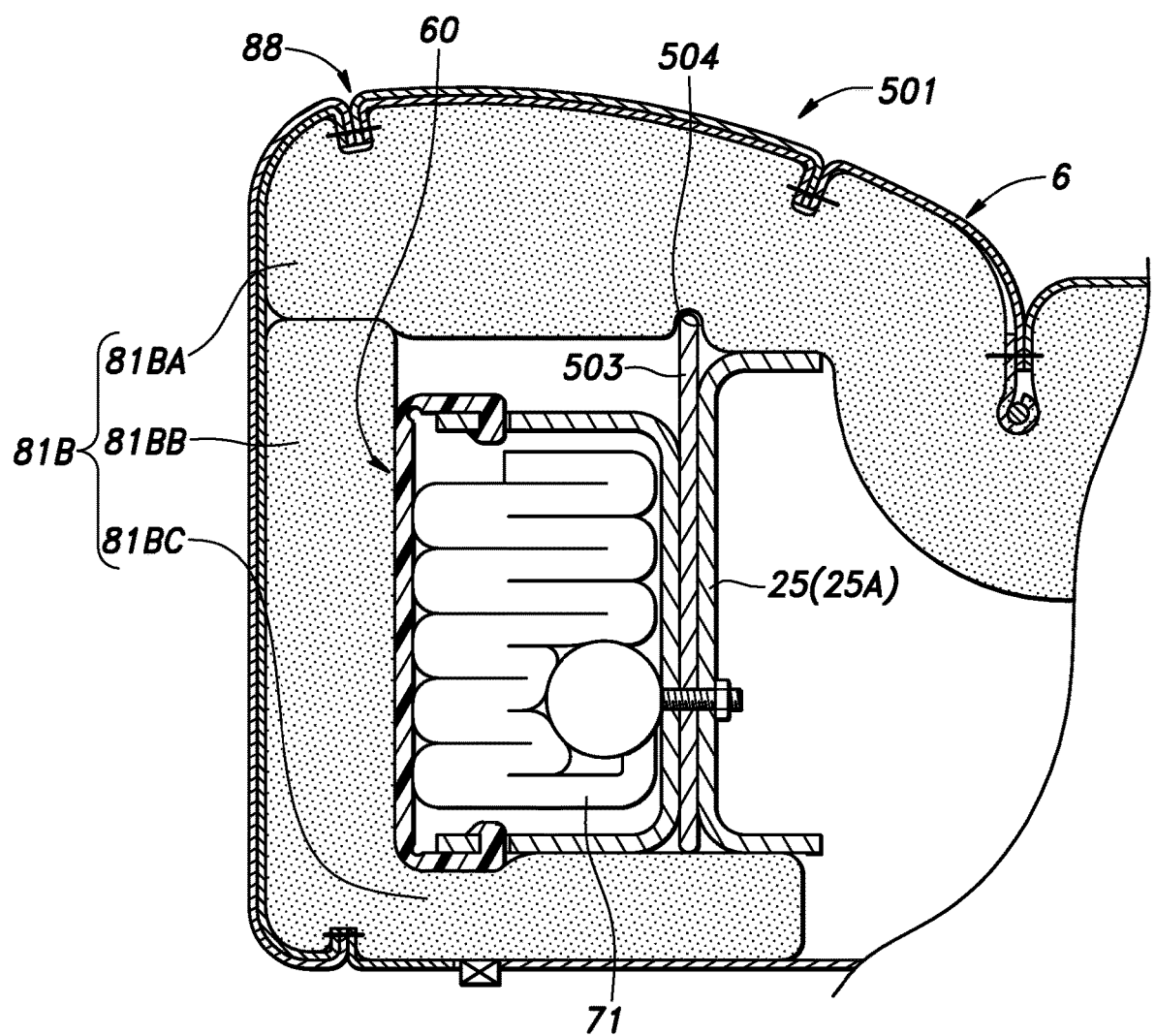

In the fifth embodiment described above, as shown in FIG. 21, instead of providing the swelling part 502, a plate member 503 supported between the left back side frame 25A and the airbag module 60 and extending forward to be in contact with the rear surface of the pad left front portion 81BA at the front end thereof may be provided. Preferably, the front end of the plate member 503 is pushed in toward the pad left front portion 81BA (forward). Thereby, as in the fifth embodiment, when the airbag 71 is expanded to be deployed, the plate member 503 can prevent intrusion of the airbag 71 toward the seat inner side (rightward). Preferably, the pad left front portion 81BA is provided with a recess 504 for receiving the front end of the plate member 503.

Figure 22:
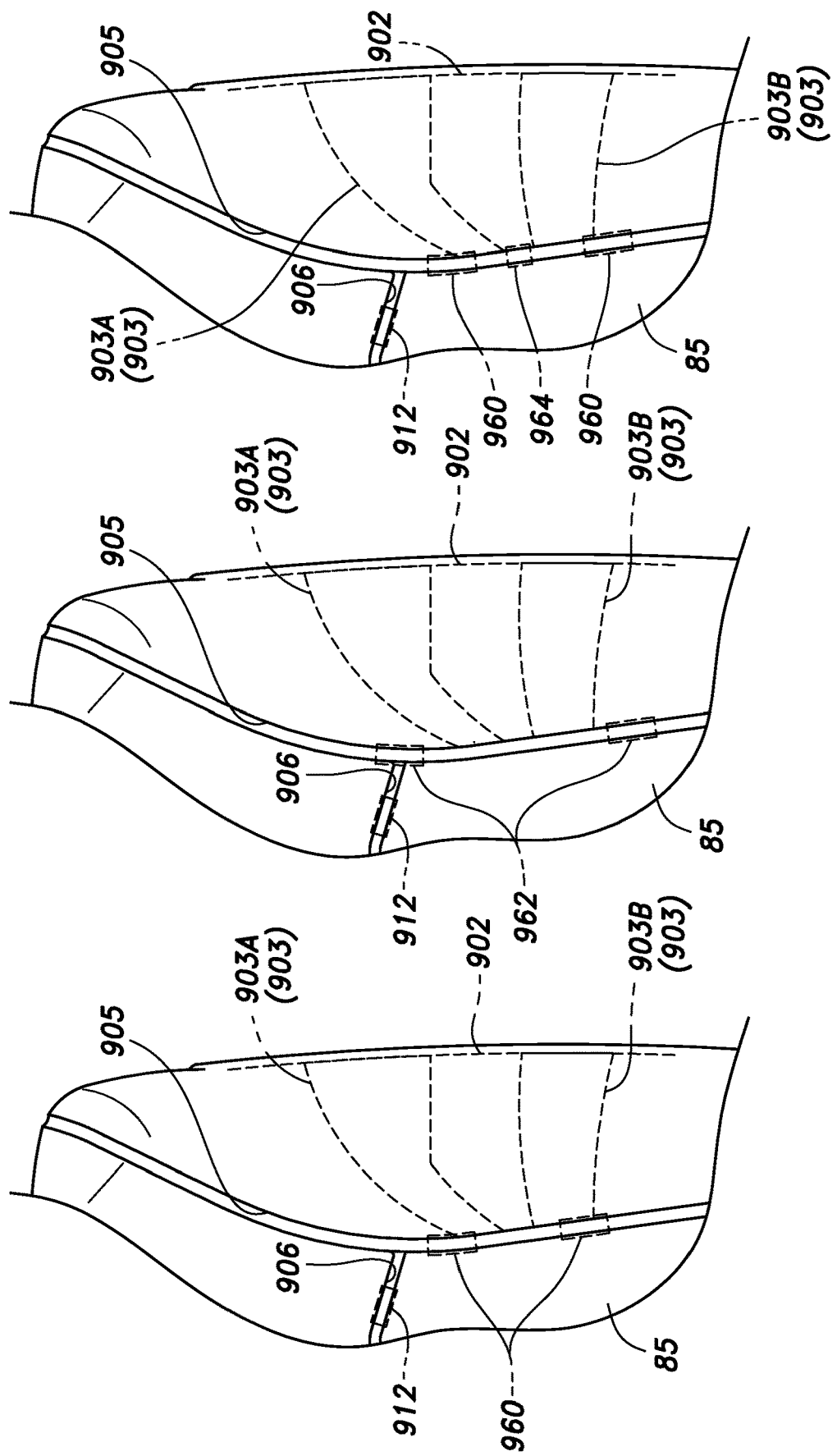
FIG. 22A is a modification of the vehicle seat according to the ninth embodiment.
FIG. 22B is another modification of the vehicle seat according to the ninth embodiment.
FIG. 22C is a further modification of the vehicle seat according to the ninth embodiment.

In the ninth embodiment described above, the webbings 903 were provided above and below the lateral groove part 906, but the present invention is not limited to this embodiment. As shown in FIGS. 22(A) to 22(C), two webbings 903 may be provided on the lower side of the lateral groove part 906.

Also, the webbings 903 may be sutured to the front skin member 85 at the right edge thereof and be sutured to the sutured part 902 at the left edge thereof. In this case, as shown in FIG. 22(A), the clips 960 for tucking the front skin member 85 into the tucking groove 904 are preferably disposed at positions at least partially overlapping with the webbings 903 in front view. Thereby, the load transmission from the webbings 903 to the clips 960 is performed smoothly at the time of deployment of the airbag 914, whereby the webbings 903 can be held more reliably.

As shown in FIG. 22(B), the clips 960 for tucking the front skin member 85 into the tucking groove 904 may be provided at positions spaced from the webbings 903. Thereby, the clips 960 are disposed to be spaced from one another, whereby the number of clips 962 used can be reduced.

As shown in FIG. 22(C), the clips 960 for tucking the front skin member 85 into the tucking groove 904 may be disposed to at least partially overlap with the webbings 903 in front view and assist clips 964 not overlapping with the webbings 903 may be additionally disposed between the webbings 903 between the clips 960 that at least partially do. The assist clips 964 resists the load applied to the webbings 903 at the time of deployment of the airbag 914, whereby release of the clips 960, which overlap with the webbings 903 at least partially and hence to which the load from the webbings 903 is easily applied, from the tucking groove 904 can be prevented more reliably.

Figure 23:
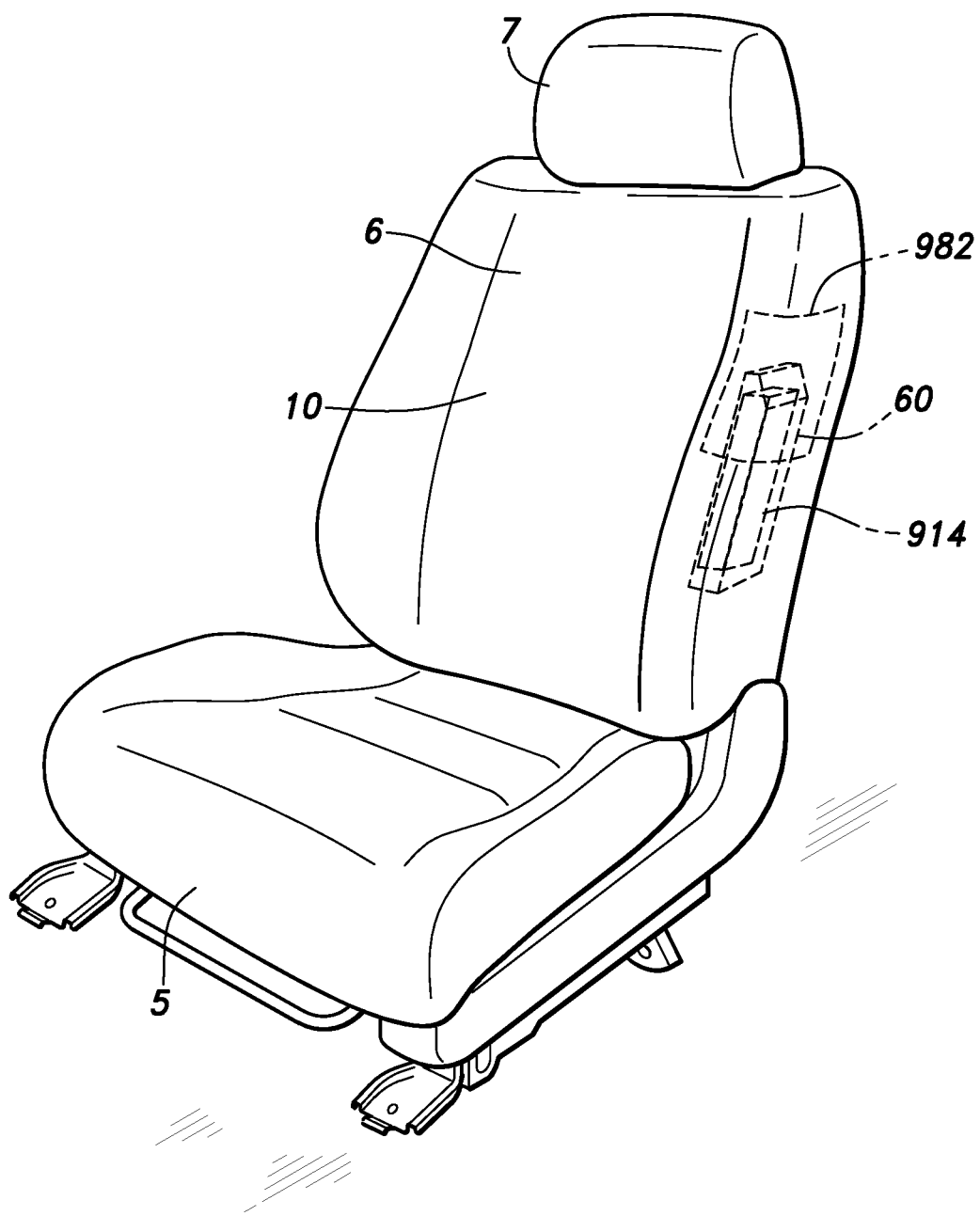
FIG. 23 is a modification of the vehicle seat according to the tenth embodiment.

In the tenth embodiment described above, the upper edge and the lower edge of the backing cloth 952 were positioned vertically outside the upper edge and the lower edge of the airbag module 60, but the present invention is not limited to this embodiment. Arrangement may be made such that the airbag module 60 (or the airbag 914 before deployment) does not at least partially overlap with the backing cloth 952 in the vertical direction and, for example, as shown in FIG. 23, the backing cloth 982 may be in a substantially rectangular strip-shape extending in the vertical direction and the lower edge thereof may be positioned substantially at the center of the airbag module 60 with respect to the vertical direction so as to cover the upper portion of the airbag module 60 (or the airbag 914 before deployment) from the left front side. Thereby, the airbag 914 is deployed more promptly to the vicinity of the hip of the seated person, and therefore, the hip of the seated person can be protected more promptly and reliably.

In the first to ninth embodiments described above, the backing cloth 952 was not provided, but the present invention is not limited to such embodiments. In the first to ninth embodiments also, the backing cloth 952 may be provided on the inner side of the pad member 23 similarly to the tenth embodiment.

Figure 24:
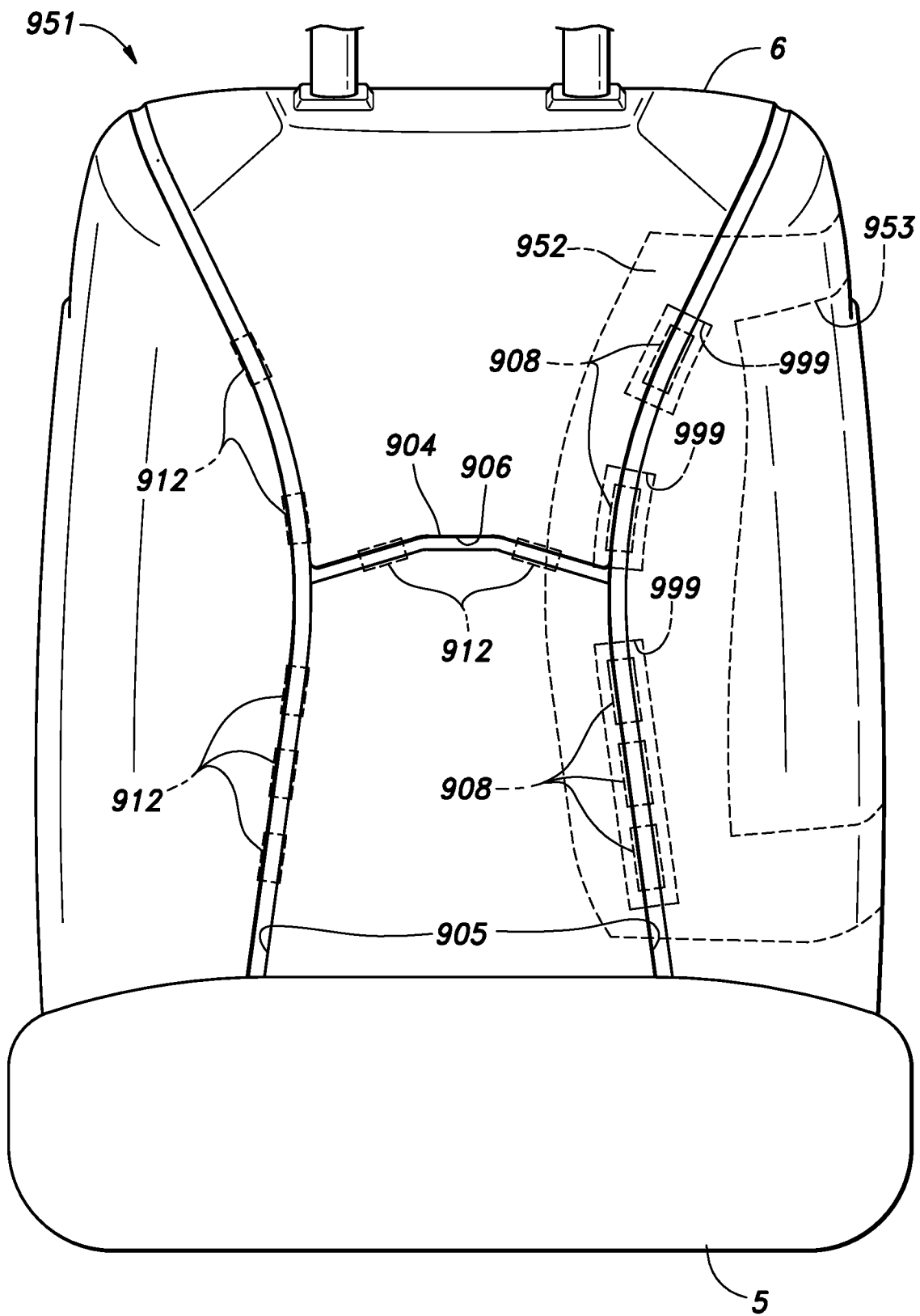
FIG. 24 is a modification of the vehicle seat according to the tenth embodiment.

Also, in the tenth embodiment described above, parts of the backing cloth 952 may be preferably cut out at positions or heights aligned with the clips 960, as shown in FIG. 24. For example, the backing cloth 952 may be preferably provided with through holes 999 at positions overlapping with the clips 960 in front view. Thereby, the stiffness of the pad member 23 reduces at positions aligned with the clips 960 to become softer compared to the part where the backing cloth 952 is provided.

Since the clips 960 are made of resin, ingenuity is necessary to ensure a holding force compared to tucking using a metallic insert wire that is generally used. As shown in FIG. 24, by providing the through holes 999 at positions overlapping with the clips 960 of the backing cloth 952 in front view, the pad member 23 becomes less stiff at the time of deployment of the airbag 914. Thereby, the load transmission force to the clips 960 can be weakened, and this can reduce the need for increasing the plate thickness of the clips 960 and/or increasing the size of the clips 960 for the purpose of enhancing the holding force.

Also, since the pad member 23 becomes softer at the parts where the through holes 999 are provided, sinking of the seated person into the seat back 6 at the time of rear collision of a vehicle can be improved compared to the case where no through hole 999 is provided.

LIST OF REFERENCE NUMERALS

1: vehicle seat according to the first embodiment
5: seat cushion
6: seat back
9: seating surface
13: pad member
14: skin member
15: side frame
22: the seat back frame
23: pad member
24: skin member
60: airbag module
71: airbag
72: inflator
73: case
73C: lid member
94: line fastener
95A: the left front joint part (joint part)
101: reinforcement cloth (first cloth member)
102: first low-elasticity reinforcement part
103: webbing (second cloth member)
104: second low-elasticity reinforcement part
201: vehicle seat according to the second embodiment
301: vehicle seat according to the third embodiment
303: left front reinforcement cloth (backing cloth)
401: vehicle seat according to the fourth embodiment
402: sewing line
501: vehicle seat according to the fifth embodiment
502: swelling part
601: vehicle seat according to the sixth embodiment
701: vehicle seat according to the seventh embodiment
801: vehicle seat according to the eighth embodiment
802: webbing
901: vehicle seat according to the ninth embodiment
903: webbing
951: vehicle seat according to the tenth embodiment

The invention claimed is:

1. A vehicle seat provided with a seat cushion constituting a seating surface and a seat back constituting a backrest, comprising:
   a seat back frame forming a structural member of the seat back;
   an airbag module supported on a side portion of the seat back frame on a vehicle outer side;
   a pad member covering the airbag module; and
   a skin member covering a surface of the pad member,
   wherein the skin member is provided with a weakened part vertically extending on an edge part of the seat back on the vehicle outer side and a first low-elasticity reinforcement part extending from a vicinity of the weakened part in a direction intersecting with the weakened part, and
   wherein the low-elasticity reinforcement part is connected to a back side part of the of the skin member covering the backside of the pad member.

2. The vehicle seat according to claim 1, wherein the skin member includes a line fastener provided at the part covering the rear side of the pad, and
   the low-elasticity reinforcement part is joined to the skin member spaced from the line fastener.

3. The vehicle seat according to claim 1, wherein the skin member includes a line fastener provided at the part covering the rear side of the pad, and
   the low-elasticity reinforcement part straddles the line fastener and is joined to the skin member at the left and right positions spaced from the line fastener.

4. The vehicle seat according to claim 1, wherein a least one tucking part is provided at the backside of the skin member,
   at least one hook is provided with the trucking part,
   the pad member includes a front central part disposed on the front side of the seat back frame and side parts positioned on the side of the front central part,
   an engaged member is provided between the front central part and one of the side parts,
   the hook is engaged with the engaged member, and
   the low-elasticity reinforcement part is joined to the skin member covering the backside of the pad member at the rear of the engaged member.

5. The vehicle seat according to claim 1, wherein the low-elasticity reinforcement part extends rearward along a side surface of the pad member to reach a rear end portion of the side surface, and extends toward a seat inner side along a rear surface of the pad member.

6. The vehicle seat according to claim 5, wherein the airbag module includes an airbag, an inflator for generating gas inside the airbag to expand the airbag, and a case accommodating the airbag and the inflator,
   the case includes a case main body having an opening and a lid member covering the opening of the case main body,
   the skin member includes a line fastener provided at the part covering the rear side of the pad, and
   the low-elasticity reinforcement passes behind the lid member.

7. The vehicle seat according to claim 5, wherein the airbag module includes an airbag, an inflator for generating gas inside the airbag to expand the airbag, and a case accommodating the airbag and the inflator,
   the case includes a case main body having an opening and a lid member covering the opening of the case main body,
   the skin member includes a line fastener provided at the part covering the rear side of the pad,
   the lid member is provided with locking claws engaged with the case main body, and
   the low-elasticity reinforcement passes behind the locking claws.

8. A manufacturing method of a vehicle seat provided with a seat cushion constituting a seating surface and a seat back constituting a backrest,
   wherein the vehicle seat comprises:
   a seat back frame forming a structural member of the seat back;
   an airbag module supported on a side portion of the seat back frame on a vehicle outer side;
   a pad member covering the airbag module; and
   a skin member covering a surface of the pad member,
   wherein the method includes a step to prepare the seat back frame with the airbag module, a step to mount the pad member on the seat back frame, and a step to cover the surface of the pad member by the skin member,
   wherein the skin member is provided with a weakened part vertically extending on an edge part of the seat back on the vehicle outer side and a low-elasticity reinforcement part extending from a vicinity of the weakened part in a direction intersecting with the weakened part,
   wherein the low-elasticity reinforcement part is connected to a back side part of the of the skin member covering the backside of the pad member.

9. The manufacturing method according to claim 8, wherein the skin member includes a line fastener provided at the part covering the rear side of the pad, and
   the low-elasticity reinforcement part is joined to the skin member spaced from the line fastener.

10. The manufacturing method according to claim 8, wherein the skin member includes a line fastener provided at the part covering the rear side of the pad, and
    the low-elasticity reinforcement part straddles the line fastener and is joined to the skin member at the left and right positions spaced from the line fastener.

11. The manufacturing method according to claim 8, wherein a least one tucking part is provided at the backside of the skin member,
    at least one hook is provided with the trucking part,
    the pad member includes a front central part disposed on the front side of the seat back frame and side parts positioned on the side of the front central part,
    an engaged member is provided between the front central part and one of the side parts,
    the hook is engaged with the engaged member, and
    the low-elasticity reinforcement part is joined to the skin member covering the backside of the pad member at the rear of the engaged member.

12. The manufacturing method according to claim 8, wherein the low-elasticity reinforcement part extends rearward along a side surface of the pad member to reach a rear end portion of the side surface, and extends toward a seat inner side along a rear surface of the pad member.

13. The manufacturing method according to claim 12, wherein the airbag module includes an airbag, an inflator for generating gas inside the airbag to expand the airbag, and a case accommodating the airbag and the inflator,
    the case includes a case main body having an opening and a lid member covering the opening of the case main body,
    the skin member includes a line fastener provided at the part covering the rear side of the pad, and the low-elasticity reinforcement passes behind the lid member.

14. The manufacturing method according to claim 12, wherein the airbag module includes an airbag, an inflator for generating gas inside the airbag to expand the airbag, and a case accommodating the airbag and the inflator, the case includes a case main body having an opening and a lid member covering the opening of the case main body, the skin member includes a line fastener provided at the part covering the rear side of the pad, the lid member is provided with locking claws engaged with the case main body, and the low-elasticity reinforcement passes behind the locking claws.

\* \* \* \* \*